United States Patent
Hiroki et al.

(10) Patent No.: US 11,165,089 B2
(45) Date of Patent: Nov. 2, 2021

(54) SECONDARY BATTERY AND ELECTRONIC DEVICE

(71) Applicant: SEMICONDUCTOR ENERGY LABORATORY CO., LTD., Atsugi (JP)

(72) Inventors: Masaaki Hiroki, Kanagawa (JP); Daisuke Furumatsu, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 321 days.

(21) Appl. No.: 16/423,904

(22) Filed: May 28, 2019

(65) Prior Publication Data

US 2019/0288325 A1    Sep. 19, 2019

Related U.S. Application Data

(63) Continuation of application No. 14/509,717, filed on Oct. 8, 2014, now Pat. No. 10,320,025.

(30) Foreign Application Priority Data

Oct. 22, 2013   (JP) ................................ 2013-219546
May 2, 2014    (JP) ................................ 2014-095169
(Continued)

(51) Int. Cl.
*H01M 10/04*   (2006.01)
*H01M 2/02*    (2006.01)
(Continued)

(52) U.S. Cl.
CPC ......... *H01M 10/0436* (2013.01); *H01M 4/70* (2013.01); *H01M 50/116* (2021.01);
(Continued)

(58) Field of Classification Search
None
See application file for complete search history.

(56) References Cited

U.S. PATENT DOCUMENTS 6,599,659 B1    7/2003   Endo et al.
6,664,005 B2    12/2003  Kezuka et al.
(Continued)

FOREIGN PATENT DOCUMENTS

CN    001433097 A    7/2003
CN    102054957 A    5/2011
(Continued)

OTHER PUBLICATIONS

JP2009016275A—machine translation (Year: 2009).*
(Continued)

*Primary Examiner* — Haroon S. Sheikh
(74) *Attorney, Agent, or Firm* — Nixon Peabody LLP; Jeffrey L. Costellia

(57) ABSTRACT

To provide a secondary battery that is suitable to a portable information terminal or a wearable device. To provide an electronic device having a novel structure that can have various forms and a secondary battery that fits the forms of the electronic device. The secondary battery includes a film provided with depressions or projections that can ease stress on the film due to application of external force. The sizes of the depressions or projections are different between a center portion and an end portion of the film. The end portion of the film is sealed with an adhesive layer. The depressions or projections of the film are formed by pressing such as embossing.

20 Claims, 24 Drawing Sheets

(30) Foreign Application Priority Data

May 23, 2014 (JP) .................................. 2014-107474
Jun. 27, 2014 (JP) .................................. 2014-133062

(51) Int. Cl.
| | |
|---|---|
| H01M 2/16 | (2006.01) |
| H01M 2/14 | (2006.01) |
| H01M 2/18 | (2006.01) |
| H01M 2/26 | (2006.01) |
| H01M 4/70 | (2006.01) |
| H01M 50/40 | (2021.01) |
| H01M 50/46 | (2021.01) |
| H01M 50/54 | (2021.01) |
| H01M 50/116 | (2021.01) |
| H01M 50/463 | (2021.01) |
| H01M 50/557 | (2021.01) |
| H01M 50/10 | (2021.01) |

(52) U.S. Cl.
CPC ........... *H01M 50/40* (2021.01); *H01M 50/46* (2021.01); *H01M 50/463* (2021.01); *H01M 50/54* (2021.01); *H01M 50/557* (2021.01); *H01M 50/10* (2021.01); *H01M 2220/30* (2013.01)

(56) References Cited

U.S. PATENT DOCUMENTS

| | | |
|---|---|---|
| 7,348,095 B2 | 3/2008 | Katsumoto et al. |
| 7,764,046 B2 | 7/2010 | Osada |
| 7,944,172 B2 | 5/2011 | Osada |
| 8,192,863 B2 | 6/2012 | Best et al. |
| 8,785,030 B2 | 7/2014 | Ueda |
| 8,847,556 B2 | 9/2014 | Osada |
| 8,852,796 B2 | 10/2014 | Kim |
| 8,900,742 B2 | 12/2014 | Ahn et al. |
| 2005/0088365 A1 | 4/2005 | Yamazaki et al. |
| 2010/0167123 A1 | 7/2010 | Kim |
| 2011/0097615 A1 | 4/2011 | Goh et al. |
| 2011/0104541 A1 | 5/2011 | Ahn et al. |
| 2011/0294009 A1 | 12/2011 | Kawakami et al. |
| 2012/0064391 A1 | 3/2012 | Fukaya et al. |
| 2012/0107657 A1 | 5/2012 | Kwon et al. |
| 2012/0202101 A1 | 8/2012 | Ueda |
| 2013/0101884 A1 | 4/2013 | Ueda |
| 2013/0134051 A1 | 5/2013 | Takahashi et al. |
| 2013/0177798 A1 | 7/2013 | Ueda |
| 2013/0224562 A1 | 8/2013 | Momo |
| 2013/0252088 A1 | 9/2013 | Kuriki et al. |
| 2013/0252089 A1 | 9/2013 | Kuriki |
| 2013/0273405 A1 | 10/2013 | Takahashi et al. |
| 2015/0140396 A1 | 5/2015 | Yamazaki |
| 2015/0140398 A1 | 5/2015 | Yamazaki |
| 2015/0155530 A1 | 6/2015 | Takahashi et al. |

FOREIGN PATENT DOCUMENTS

| | | |
|---|---|---|
| CN | 102959760 A | 3/2013 |
| CN | 103190025 A | 7/2013 |
| EP | 2312669 A | 4/2011 |
| EP | 2325929 A | 5/2011 |
| EP | 2634852 A | 9/2013 |
| JP | 58-197655 A | 11/1983 |
| JP | 59-189554 A | 10/1984 |
| JP | 07-006771 A | 1/1995 |
| JP | 09-213377 A | 8/1997 |
| JP | 09-274935 A | 10/1997 |
| JP | 09-320637 A | 12/1997 |
| JP | 10-326602 A | 12/1998 |
| JP | 2000-173559 A | 6/2000 |
| JP | 2000-315489 A | 11/2000 |
| JP | 2001-093581 A | 4/2001 |
| JP | 2001-102090 A | 4/2001 |
| JP | 2001-266894 A | 9/2001 |
| JP | 2002-063938 A | 2/2002 |
| JP | 2003-257408 A | 9/2003 |
| JP | 2005-129393 A | 5/2005 |
| JP | 2005-157317 A | 6/2005 |
| JP | 2005-332591 A | 12/2005 |
| JP | 2006-172773 A | 6/2006 |
| JP | 2006-331874 A | 12/2006 |
| JP | 2007-066619 A | 3/2007 |
| JP | 2007-234466 A | 9/2007 |
| JP | 2009-016275 A | 1/2009 |
| JP | 2009-187768 A | 8/2009 |
| JP | 2009-533831 A | 9/2009 |
| JP | 2010-135231 A | 6/2010 |
| JP | 2010-232145 A | 10/2010 |
| JP | 2011-086608 A | 4/2011 |
| JP | 2011-096620 A | 5/2011 |
| JP | 2011-129378 A | 6/2011 |
| JP | 2012-009418 A | 1/2012 |
| JP | 2012-064337 A | 3/2012 |
| JP | 2012-142153 A | 7/2012 |
| JP | 2013-048041 A | 3/2013 |
| JP | 2013-048042 A | 3/2013 |
| KR | 2011-0048131 A | 5/2011 |
| KR | 2012-0043368 A | 5/2012 |
| KR | 2012-0075377 A | 7/2012 |
| WO | WO-2007/118281 | 10/2007 |
| WO | WO-2012/001885 | 1/2012 |
| WO | WO-2012/140707 | 10/2012 |
| WO | WO-2012/140709 | 10/2012 |

OTHER PUBLICATIONS

German Office Action (Application No. 102014019810.3) dated Mar. 14, 2017.

Chinese Office Action (Application No. 201410564679.7) dated Feb. 11, 2018.

* cited by examiner

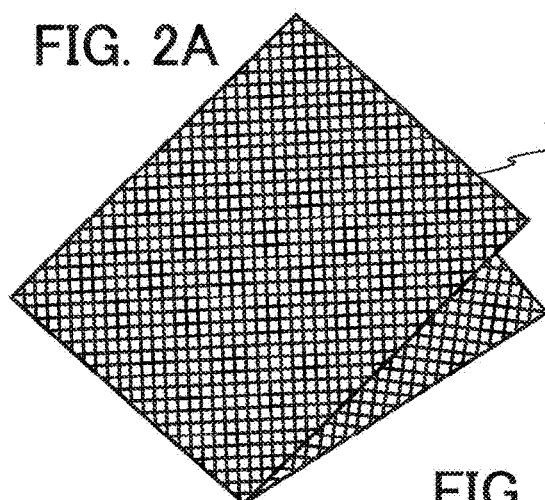
FIG. 2A
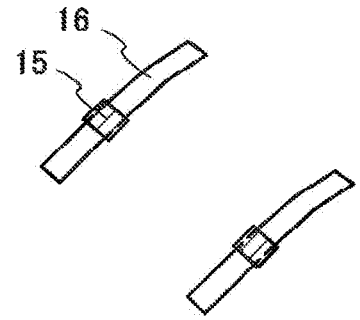
FIG. 2C
FIG. 2B
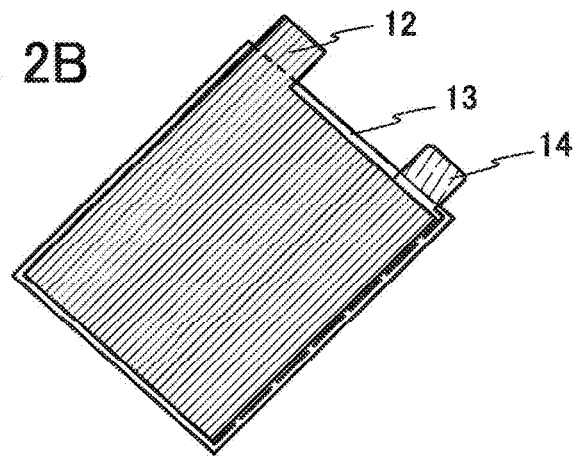
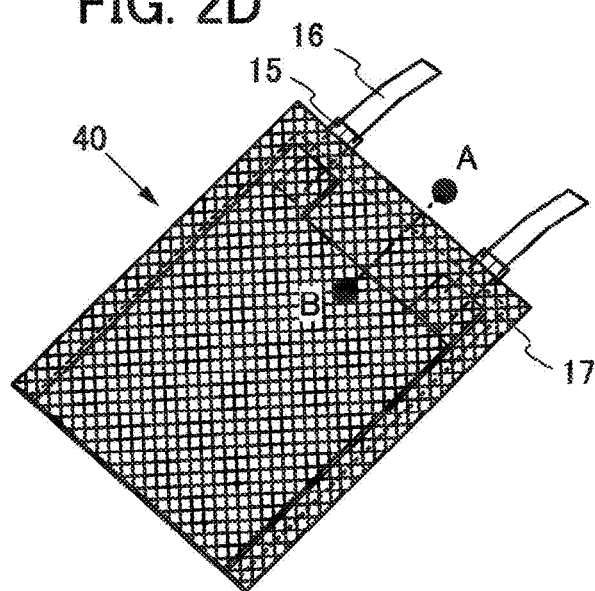
FIG. 2D
FIG. 2F
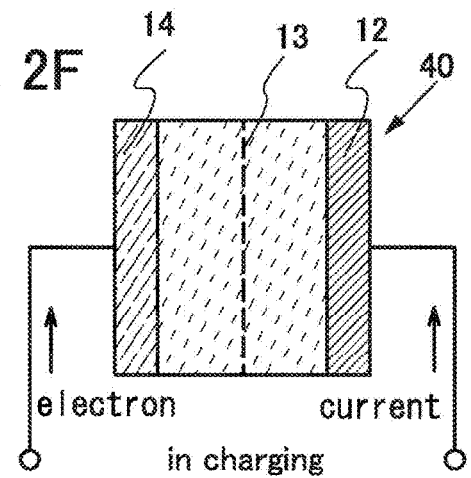
FIG. 2E
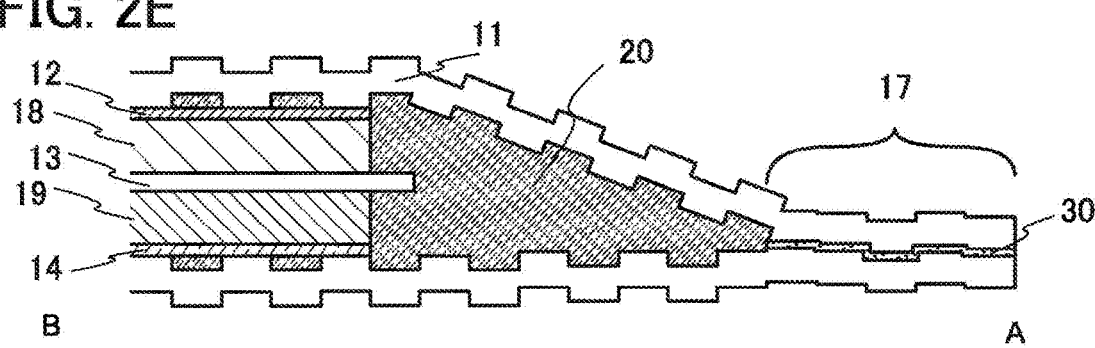

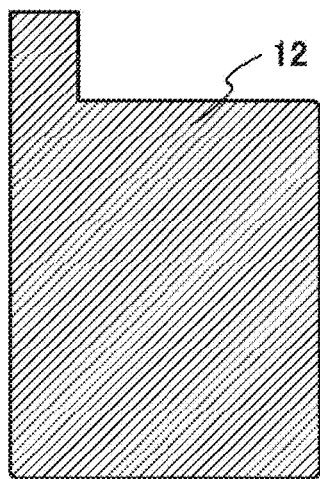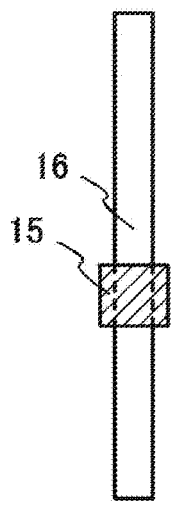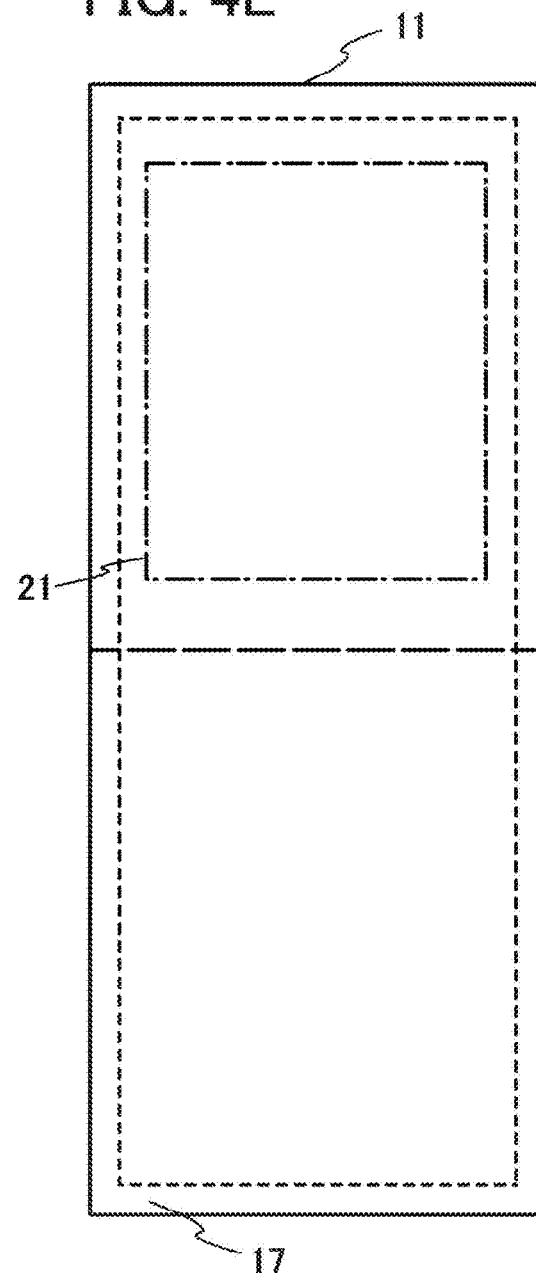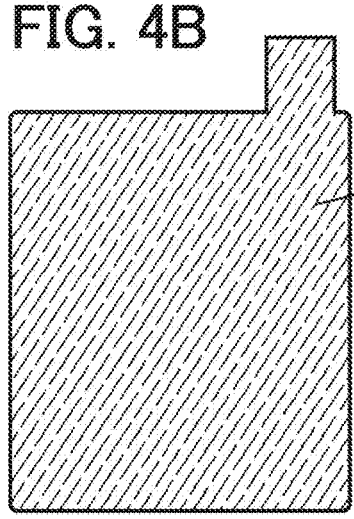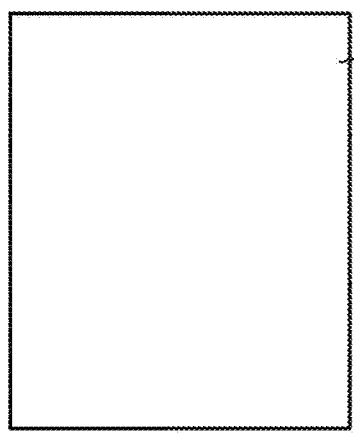

0 times 1000 times 3000 times 6000 times 10000 times 0 times 1000 times 3000 times 6000 times 10000 times

SECONDARY BATTERY AND ELECTRONIC DEVICE

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method thereof, or a manufacturing method thereof. In particular, one embodiment of the present invention relates to an electronic device.

Note that electronic devices in this specification mean all devices including secondary batteries, and electro-optical devices including secondary batteries, information terminal devices including secondary batteries, vehicles including secondary batteries, and the like are all electronic devices.

2. Description of the Related Art

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a goggle-type display device that includes a CPU and is capable of data communication. The device disclosed in Patent Document 1 is also a kind of electronic device.

Most wearable devices and portable information terminals include secondary batteries that can be repeatedly charged and discharged, and have problems in that there is a limitation on the time for operation of the wearable devices and the portable information terminals because their light weight and compactness limit the battery capacity. Secondary batteries used in wearable devices and portable information terminals should be lightweight and compact and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

Electrodes serving as positive electrodes or negative electrodes of lithium-ion secondary batteries are each formed using, for example, lithium metal, a carbon-based material, or an alloy material.

REFERENCE

[Patent Document 1] Japanese Published Patent Application No. 2005-157317

SUMMARY OF THE INVENTION

An object is to provide a secondary battery suitable for a portable information terminal.

Another object is to provide a secondary battery suitable for a wearable device. Another object is to provide a novel power storage device.

Another object is to provide an electronic device having a novel structure, specifically, an electronic device having a novel structure that can be changed in appearance in various ways. Another object is to provide an electronic device having a novel structure that can have various forms and a secondary battery that fits the forms of the electronic device.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

In the case where an electronic device is formed to have a complicated form, a housing is designed to have a complicated form and electronic components (e.g., a power source, a wiring, a transistor, a resistor, and a capacitor) are arranged in an internal space of the housing. When it does not matter how large and heavy the electronic device is, the volume of the internal space of the housing is relatively large; thus, the electronic components can be arranged relatively freely.

In the case where an electronic device having a complicated form is required to be compact and lightweight, the volume of an internal space of a housing is small, and electronic components and the sizes thereof are selected according to the volume and the electronic components are arranged. In this case, the manufacturing cost is increased because smaller electronic components are more expensive.

Moreover, as the volume or weight of a secondary battery increases, the capacity thereof tends to increase. Therefore, there are limitations on the size and arrangement of a secondary battery that is incorporated in a small electronic device.

An increase in the mileage per charge of a vehicle using a secondary battery such as an electric vehicle and a hybrid vehicle increases the volume or weight of the secondary battery.

In view of the above, a secondary battery that can be changed in form is used for an electronic device and the secondary battery and other electronic components are arranged with efficiency in the internal space of a housing of the electronic device.

In the case where a secondary battery is changed in form by externally applying force, the force is externally applied to an object such as a film used as an exterior body of the secondary battery and the object is stressed. This might partly deform or damage the object.

A secondary battery that can relieve a strain caused by stress is provided. A "strain" is the scale of change in form indicating the displacement of a point of an object relative to the reference (initial) length of the object. A secondary battery that can reduce the influence of a strain, that is, the scale of change in form caused by application of external force to the secondary battery, to an acceptable level is provided. Such a structure as can relieve a strain caused by stress can prevent the secondary battery (e.g., an exterior body) from being damaged when changed in form by being bent, for example, achieving long-time reliability.

One embodiment of the invention disclosed in this specification is a secondary battery including a film provided with depressions or projections that can ease stress on the film due to application of external force. The heights of the depressions or projections are different between a center portion and an end portion of the film. The end portion of the film is sealed with an adhesive layer.

Another embodiment of the invention disclosed in this specification is a secondary battery including a film having a pattern formed by depressions or projections on part of a surface thereof. The heights of the depressions or projections are different between a center portion and an end portion of the film. The end portion of the film is sealed with an adhesive layer.

In the above structure, the pattern of the film is a geometric pattern in which lines slanted in two directions cross each other and which can be visually recognized. In the case of such a geometric pattern in which lines slanted in two directions cross each other, stress due to bending can be relieved in at least two directions. The depressions or projections are not necessarily arranged regularly and may be arranged randomly. Random arrangement enables stress due to not only two-dimensional bending but stress due to three-dimensional random bending or twisting to be relieved. The film may partly include a plurality of regions having different patterns. The film may be provided with depressions or projections only in a bendable portion and may have a flat surface in the other portion.

The depressions or projections of the film are formed by pressing, e.g., embossing. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. The sealing structure using the film can prevent entry of water and dust. Note that embossing, which is a kind of pressing, is not necessarily employed and any method that allows formation of a relief on part of the film is employed. A combination of the methods, for example, embossing and any other pressing may be performed on one film. Alternatively, embossing may be performed on one film more than once.

Although the secondary battery can have any of a variety of structures, a structure where a film is used as an exterior body is employed here. Note that the film used as an exterior body is a single-layer film selected from metal films (e.g., an aluminum film, a stainless steel film, and a nickel steel film), a plastic film made of an organic material, a hybrid material film containing an organic material (e.g., an organic resin or fiber) and an inorganic material (e.g., ceramic), carbon-containing films (e.g., a carbon film and a graphite film), and the like or a layered film including two or more of the above films. Metal films are easy to be embossed. Forming depressions or projections by embossing increases the surface area of the film exposed to outside air, achieving efficient heat dissipation.

The sealing structure of the secondary battery is as follows: one rectangular film is folded in half so that two end portions each including two of the four corners overlap with each other (the folded portion is sandwiched between the end portions) and is sealed on three sides with an adhesive layer, or two films are stacked so as to overlap with each other and is sealed on four sides of the film with an adhesive layer.

The adhesive layer can be formed using a thermoplastic film material, a thermosetting adhesive, an anaerobic adhesive, a photo-curable adhesive such as a UV curable adhesive, or a reactive curable adhesive. Examples of materials of the adhesives include an epoxy resin, an acrylic resin, a silicone resin, and a phenol resin.

In forming the sealing structure by bonding and fixing the adhesive layer and the film, pressure bonding is performed so that the heights of the depressions or projections are different between an end portion of the film, which is subjected to pressure bonding, and a center portion of the film. When the height of the depressions or projections in the end portion of the film is smaller than that of the depressions or projections in the center portion of the film, the influence of a strain can be reduced to be within the allowable range.

In the case where a film is provided with depressions or projections in a center portion and not provided with depressions or projections in an end portion subjected to pressure bonding, the obstructed space of the secondary battery can greatly expand when the volume of internal components of the secondary battery expands in the center portion. That is, such a film can prevent explosion of the secondary battery. On the other hand, because of absence of depressions or projections in the end portion, flexibility of the end portion is lower than that in the center portion and stress is less likely to be relieved in the end portion than in the center portion. Therefore, providing depressions or projections also in the end portion of the film helps reduce the influence of a strain to an acceptable level.

The term "electronic device having a complicated form" can be interpreted in many ways. It can be interpreted as an electronic device having a fixed complicated form (e.g., the form having a curved surface). In the case of fixing the form of the electronic device, a secondary battery is bent once and fixed while being bent. In addition, the term can also be interpreted as an electronic device having a complicated form that changes or does not change its form when external force is applied or an electronic device having a simple form that changes its form when external force is applied. In the case of an electronic device that changes its form when force is applied, it is preferable that a secondary battery also be able to change its form every time force is applied.

One embodiment of the invention disclosed in this specification is an electronic device including a housing partly having a curved surface and a secondary battery having a curved surface. An exterior body of the secondary battery is a film whose surface partly has a pattern formed by depressions or projections.

Another embodiment of the invention disclosed in this specification is an electronic device including a housing and a secondary battery in contact with part of the housing. An exterior body of the secondary battery is a film whose surface partly has a pattern formed by depressions or projections. The housing can partly change its form.

In the above structure, the exterior body of the secondary battery can change its form in the range of radius of curvature from 10 mm to 150 mm, preferably from 30 mm to 150 mm. One or two films are used as the exterior body of the secondary battery. In the case where the secondary battery has a layered structure and the secondary battery has an arc-formed cross section by bending the secondary battery, the secondary battery has a structure where the components thereof is sandwiched between two curved surfaces of the films.

A description is given of the radius of curvature of a surface with reference to FIGS. 19A to 19C. In FIG. 19A, on a plane 1701 along which a curved surface 1700 is cut, part of a curve 1702, which is a form of the curved surface, is approximate to an arc of a circle, and the radius of the circle is referred to as a radius 1703 of curvature and the center of the circle is referred to as a center 1704 of curvature. FIG. 19B is a top view of the curved surface 1700. FIG. 19C is a cross-sectional view of the curved surface 1700 taken along the plane 1701. When a curved surface is cut along a plane, the radius of curvature of a curve depends on along which plane the curved surface is cut. Here, the radius of curvature of a curved surface is defined as the radius of curvature of a curve on a plane along which the curved surface is cut such that the curve has the smallest radius of curvature.

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 20A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 20B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm Note that the cross-sectional shape of the secondary battery is not limited to a simple arc shape, and the cross section can be partly arc-shaped; for example, a shape illustrated in FIG. 20C, a wavy shape illustrated in FIG. 20D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

When the secondary battery is bent with the center of curvature being on the inner side and seen in cross section, the outside surface is stretched and the inside surface is compressed. In other words, the outside expands and the inside contracts. The bendable secondary battery can also be called an elastic secondary battery.

When a secondary battery in which an electrolyte solution is held between two films serving as exterior bodies is bent, the radius of curvature of a first film is smaller than that of a second film. In addition, in the secondary battery, a pattern of a surface of the first film is different from that of the second film. When the secondary battery is bent and has an arc-shaped cross section, compressive stress is applied to a surface of the film on the side closer to the center of curvature and tensile stress is applied to a surface of the film on the side farther from the center of curvature. Even when compressive stress or tensile stress is applied to a film surface in such a manner, the influence of a stain is allowable because a surface of the exterior body has a pattern formed by depressions or projections.

Part of a device like a watch is brought in contact with part of the body of a user, that is, the user wears the device, whereby the user can feel like the device is lighter than the actual weight. The use of a flexible secondary battery in an electronic device having a form with a curved surface that fits part of the body of a user allows the secondary battery to be fixed so as to have a form suitable to the electronic device and provided.

When a user moves part of the body on which an electronic device is worn, the user might feel uncomfortable, regard the electronic device as a distraction, and feel stress even in the case where the electronic device has a curved surface that fits part of the body. In the case where at least part of an electronic device can be changed in form according to movement of a body of a user, the user does not feel uncomfortable and a flexible battery can be provided in a portion of the electronic device that can be changed in form.

An electronic device does not necessarily have a form with a curved surface or a complicated form; an electronic device may have a simple form. For example, the number or size of components that can be incorporated in an electronic device with a simple form is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of wearable devices include devices that store data, send data, and receive data, typically, a portable information terminal and a memory.

A secondary battery having a novel structure can be provided. A novel power storage device can be provided.

The form of a secondary battery can be freely designed and when a secondary battery having a curved surface is used for example, the flexibility of a whole device is increased and devices having a variety of designs can be fabricated. Furthermore, a secondary battery is provided inside and along a curved surface of a device with the least wasted space in the device having the curved surface, whereby it is possible to make maximum use of a space in the device.

Thus, an electronic device having a novel structure can be provided.

Note that the description of these effects does not disturb the existence of other effects. One embodiment of the present invention does not have to achieve all the objects listed above. Other effects will be apparent from and can be derived from the description of the specification, the drawings, the claims, and the like.

BRIEF DESCRIPTION OF THE DRAWINGS

In the accompanying drawings:

FIGS. 2A to 2F are perspective views illustrating one embodiment of the present invention;

FIGS. 4A to 4E are top views illustrating one embodiment of the present invention;

DETAILED DESCRIPTION OF THE INVENTION

Figure 1A:
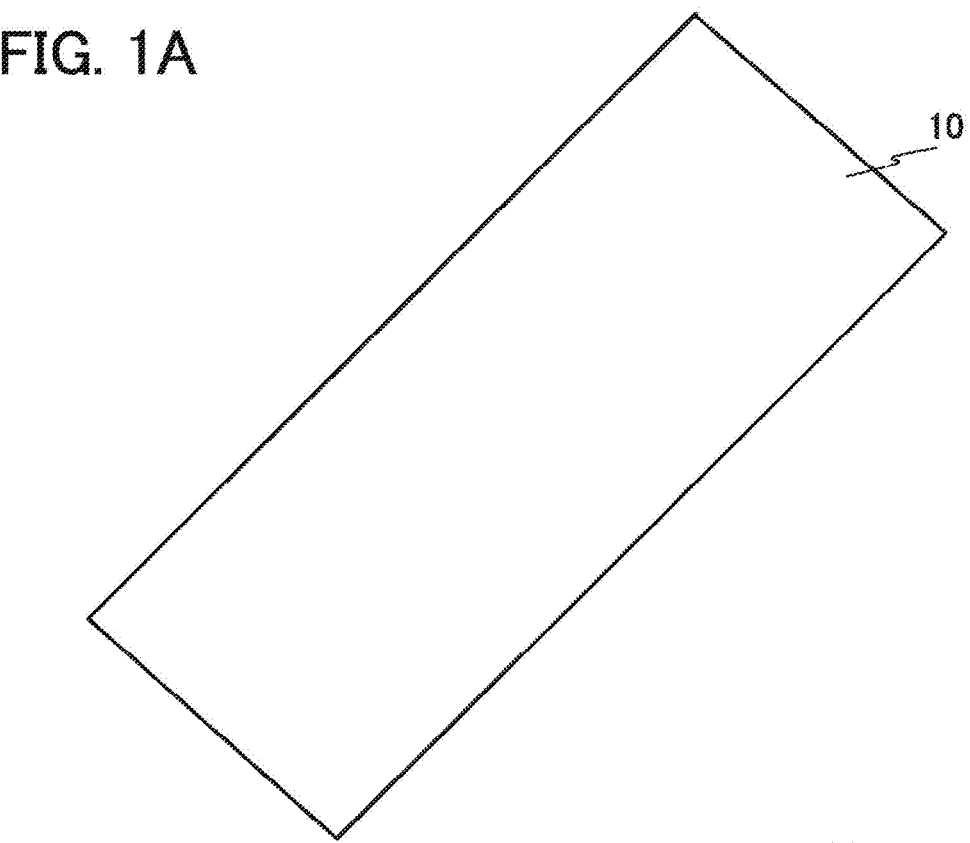
FIGS. 1A and 1B are top views each illustrating one embodiment of the present invention.

Embodiments and examples of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments and the examples.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for simplification. Therefore, the disclosed invention is not necessarily limited to the position, size, range, or the like disclosed in the drawings and the like.

The ordinal number such as "first", "second", and "third" are used to avoid confusion among components.

Note that in this specification, a term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100° and accordingly also includes the case where the angle is greater than or equal to 85° and less than or equal to 95°.

Embodiment 1

In this embodiment, an example of fabricating a lithium-ion secondary battery with the use of a film whose surface is embossed with a pattern will be described.

First, a sheet made of a flexible material is prepared. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. This sheet is cut to obtain a film 10 illustrated in FIG. 1A.

Figure 1B:
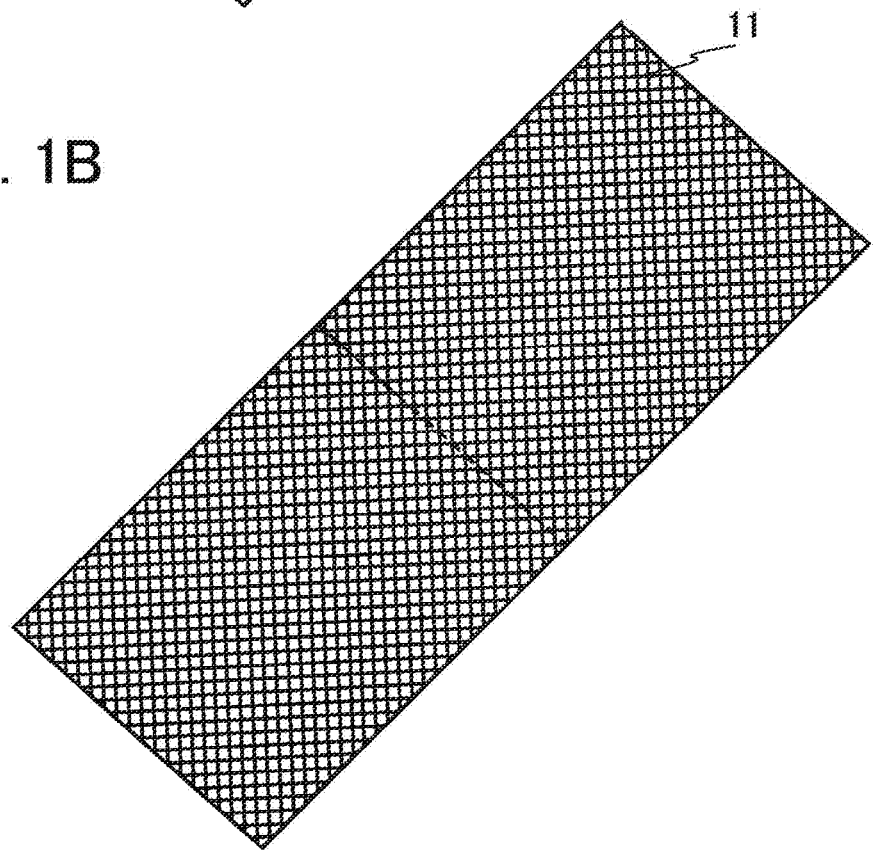

Then, the film 10 is embossed to form unevenness so that the pattern can be visually recognized as illustrated in FIG. 1B. Although an example where the sheet is cut and then embossing is performed is described here, the order is not particularly limited; embossing may be performed before cutting the sheet and then the sheet is cut so as to be in the state illustrated in FIG. 1B. Alternatively, the sheet may be cut after thermocompression bonding is performed with the sheet bent.

Figure 3A:
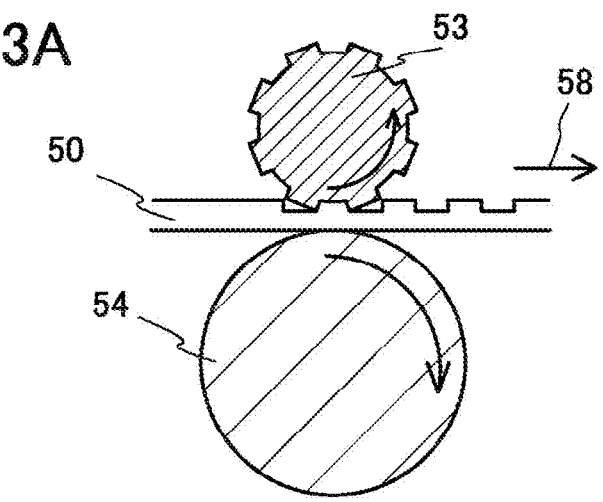
FIGS. 3A to 3C each illustrate embossing of one embodiment of the present invention.
Figure 3B:
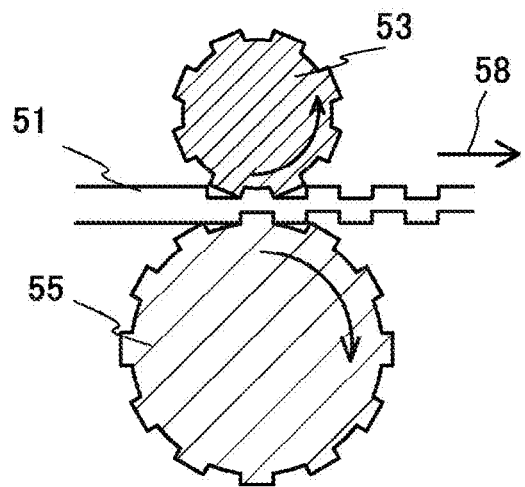
Figure 3C:
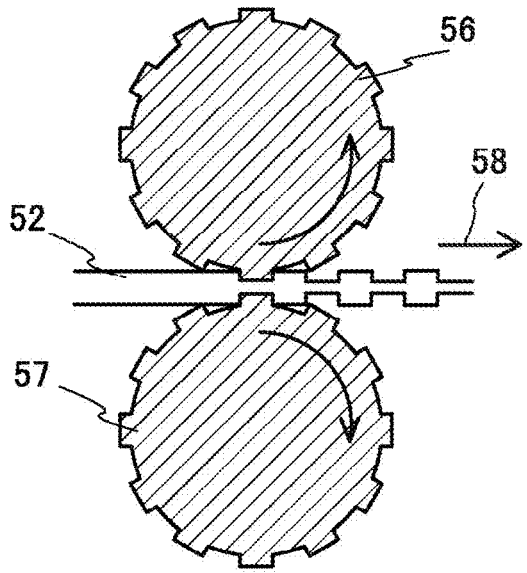

Embossing, which is a kind of pressing, will be described. FIGS. 3A to 3C are cross-sectional views each showing an example of embossing. Note that embossing refers to processing for forming unevenness on a surface of a film by bringing an embossing roll whose surface has unevenness into contact with the film with pressure. The embossing roll is a roll whose surface is patterned.

An example where one surface of a film is embossed is illustrated in FIG. 3A.

FIG. 3A illustrates the state where a film 50 is sandwiched between an embossing roll 53 in contact with the one surface of the film and a roll 54 in contact with the other surface and the film 50 is being transferred in a direction 58 of movement of the film 50. The surface of the film is patterned by pressure or heat.

Processing illustrated in FIG. 3A is called one-side embossing performed by a combination of the embossing roll 53 and the roll 54 (a metal roll or an elastic roll (e.g., rubber roll)).

An example where both surfaces of a film are embossed is illustrated in FIG. 3B.

FIG. 3B illustrates the state where a film 51 is sandwiched between the embossing roll 53 in contact with one surface of the film and an embossing roll 55 in contact with the other surface and the film 51 is being transferred in the direction 58 of movement of the film 51.

Processing illustrated in FIG. 3B is called both-side embossing performed by a combination of the embossing roll 53 and the embossing roll 55, which are a couple of embossing rolls.

The surface of the film 51 is patterned by unevenness, that is, projections for concaving part of the surface of the film and depressions for convexing part of the surface of the film that are alternately provided.

FIG. 3C illustrates the state where a film 52 is sandwiched between an embossing roll 56 in contact with one surface of the film and an embossing roll 57 in contact with the other surface and the film 52 is being transferred in the direction 58 of movement of the film 52.

Processing illustrated in FIG. 3C is called Tip to Tip both-side embossing performed by a combination of the embossing roll 56 and the embossing roll 57 that has the same pattern as the embossing roll 56. The phases of the projections and depressions of the two embossing rolls are the same, so that substantially the same pattern can be formed on the top surface and bottom surface of the film 52.

The embossing roll is not necessarily used, and an embossing plate may be used. Furthermore, embossing is not necessarily employed, and any method that allows formation of a relief on part of the film is employed.

In this embodiment, both surfaces of a film 11 are provided with unevenness to have patterns, and the film 11 is folded in half so that two end portions each including two of the four corners overlap with each other, and is sealed on three sides with an adhesive layer.

Then, the film 11 is folded along a dotted line shown in FIG. 1B so as to be in the state illustrated in FIG. 2A.

A positive electrode current collector 12, a separator 13, and a negative electrode current collector 14 that are stacked and included in a secondary battery as illustrated in FIG. 2B are prepared. The positive electrode current collector 12 and the negative electrode current collector 14 can each be formed using a highly conductive material that is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive. Note that the example where one combination of the positive electrode current collector 12, the separator 13, and the negative electrode current collector 14 that are stacked is packed in an exterior body is illustrated here for simplicity. To increase the capacity of a secondary battery, a plurality of combinations may be stacked and packed in an exterior body.

In addition, two lead electrodes 16 with sealing layers 15 illustrated in FIG. 2C are prepared. The lead electrodes 16 are each also referred to as a lead terminal and provided in order to lead a positive electrode or a negative electrode of a secondary battery to the outside of an exterior film.

Then, one of the lead electrodes is electrically connected to a protruding portion of the positive electrode current collector 12 by ultrasonic welding or the like. Aluminum is used as a material of the lead electrode connected to the protruding portion of the positive electrode current collector 12. The other lead electrode is electrically connected to a protruding portion of the negative electrode current collector 14 by ultrasonic welding or the like. Nickel-plated copper is used as a material of the lead electrode connected to the protruding portion of the negative electrode current collector 14.

Then, two sides of the film 11 are sealed by thermocompression bonding, and one side is left open for introduction of an electrolytic solution. In thermocompression bonding, the sealing layers 15 provided on the lead electrodes are also melted, thereby fixing the lead electrodes and the film 11 to each other. After that, in a reduced-pressure atmosphere or an inert atmosphere, a desired amount of electrolytic solution is introduced to the inside of the film 11 in the form of a bag. Lastly, the outer edge of the film that has not been subjected to thermocompression bonding and is left open is sealed by thermocompression bonding.

In this manner, a secondary battery 40 illustrated in FIG. 2D can be fabricated.

In the obtained secondary battery 40, the surface of the film 11 serving as an exterior body has a pattern including unevenness. An edge region indicated by a dotted line in FIG. 2D is a thermocompression-bonded region 17. A surface of the thermocompression-bonded region 17 also has a pattern including unevenness. Although the unevenness in the thermocompression-bonded region 17 is smaller than that in a center portion, it can relieve stress applied when the secondary battery is bent. Such a structure as can relieve a strain caused by stress can prevent the secondary battery (e.g., an exterior body) from being damaged when changed in form by being bent, for example, achieving long-time reliability.

FIG. 2E illustrates an example of a cross section taken along dashed-dotted line A-B in FIG. 2D.

As illustrated in FIG. 2E, unevenness of the film 11 is different between a region overlapping with the positive electrode current collector 12 and the thermocompression-bonded region 17. As illustrated in FIG. 2E, the positive electrode current collector 12, a positive electrode active material layer 18, the separator 13, a negative electrode active material layer 19, and the negative electrode current collector 14 are stacked in this order and placed inside the folded film 11, an end portion is sealed with an adhesive layer 30, and the other space is provided with an electrolytic solution 20.

Examples of positive electrode active materials that can be used for the positive electrode active material layer 18 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiNi_cCo_dMn_ePO_4$, $LiNi_cCo_dMn_ePO_4$ (c+d+e≤0<c<1, 0<d 21 1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j<2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$ $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r±s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 13, an insulator such as cellulose (paper), polyethylene with pores, and polypropylene with pores can be used.

As an electrolyte of an electrolytic solution, a material that contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 19; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal, For the negative electrode active material, an alloy-based material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of the material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as SiO, (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_2O_3$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

In the secondary battery, for example, the separator 13 has a thickness of approximately 25 μm, the positive electrode current collector 12 has a thickness of approximately 20 μm to 40 μm, the positive electrode active material layer 18 has a thickness of approximately 100 μm, the negative electrode active material layer 19 has a thickness of approximately 100 μm, and the negative electrode current collector 14 has a thickness of approximately 20 μm to 40 μm. The film 11 has a thickness of 0.113 mm. The film 11 is embossed to a depth of approximately 500 μm. If the film 11 is embossed to a depth of 2 mm or more, the whole secondary battery is too thick; thus, the film 11 is embossed to a depth of 1 mm or less, preferably 500 μm or less. Although the adhesive layer 30 is only partly illustrated in FIG. 2E, only a thermocompression-bonded portion of a layer made of polypropylene which is provided on the surface of the film 11 is the adhesive layer 30.

FIG. 2E illustrates an example where the bottom side of the film 11 is fixed and pressure bonding is performed. In this case, the top side is greatly bent and a step is formed. Thus, when a plurality of combinations of the above stacked layers (e.g., eight or more combinations) is provided inside the folded film 11, the step is large and the top side of the film 11 might be too stressed. Furthermore, an end face of the top side of the film might be misaligned with an end face of the bottom side of the film. To prevent misalignment of the end faces, a step may also be provided for the bottom side of the film and pressure bonding may be performed so that the thermocompression-bonded region 17 is positioned at a center portion in the thickness direction of the secondary battery, whereby stress is uniformly applied.

Here, a current flow in charging a secondary battery will be described with reference to FIG. 2F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Two terminals in FIG. 2F are connected to a charger, and a secondary battery 40 is charged. As the charge of the secondary battery 40 proceeds, a potential difference between electrodes increases. The positive direction in FIG. 2F is the direction in which a current flows from one terminal outside the secondary battery 40 to the positive electrode current collector 12, flows from the positive electrode current collector 12 to the negative electrode current collector 14 in the secondary battery 40, and flows from the negative electrode current collector 14 to the other terminal outside the secondary battery 40. In other words, a current flows in the direction of a flow of a charging current.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is also possible.

Embodiment 2

In this embodiment, an example where a plurality of combinations of stacked layers that are partly different from those in Embodiment 1 is provided inside the folded film 11 will be described.

FIG. 4A is a top view of the positive electrode current collector 12. FIG. 4B is a top view of the negative electrode current collector 14. FIG. 4C is a top view of the separator 13. FIG. 4D is a top view of the lead electrode 16. FIG. 4E is a top view of the film 11.

The dimensions of the positive electrode current collector, the negative electrode current collector, and the separator are substantially the same in FIGS. 4A to 4C. A region 21 surrounded by a chain line in FIG. 4E has substantially the same dimensions as the separator in FIG. 4C. A region between a dotted line and an end face in FIG. 4E is the thermocompression-bonded region 17.

Figure 5A:
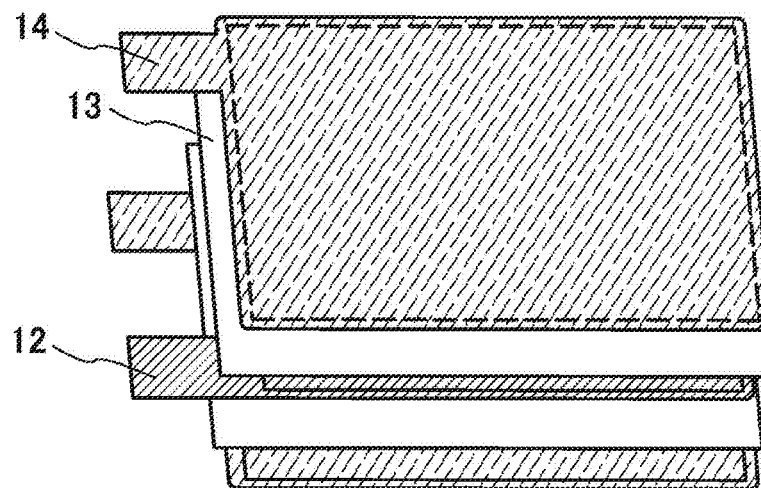
FIGS. 5A and 5B are perspective views each illustrating one embodiment of the present invention.

FIG. 5A is a perspective view of two combinations of pairs of a positive electrode and a negative electrode. Note that an example where the positive electrode current collector 12 is sandwiched between a positive electrode active material layers is illustrated. Specifically, the negative electrode current collector 14, a negative electrode active material layer, the separator 13, a positive electrode active material layer, the positive electrode current collector 12, a positive electrode active material layer, the separator, a negative electrode active material layer, the negative electrode current collector are stacked in this order. Although two separators are illustrated in FIG. 5A, one separator may be folded and the positive electrode current collector 12 may be placed inside the folded separator.

Figure 5B:
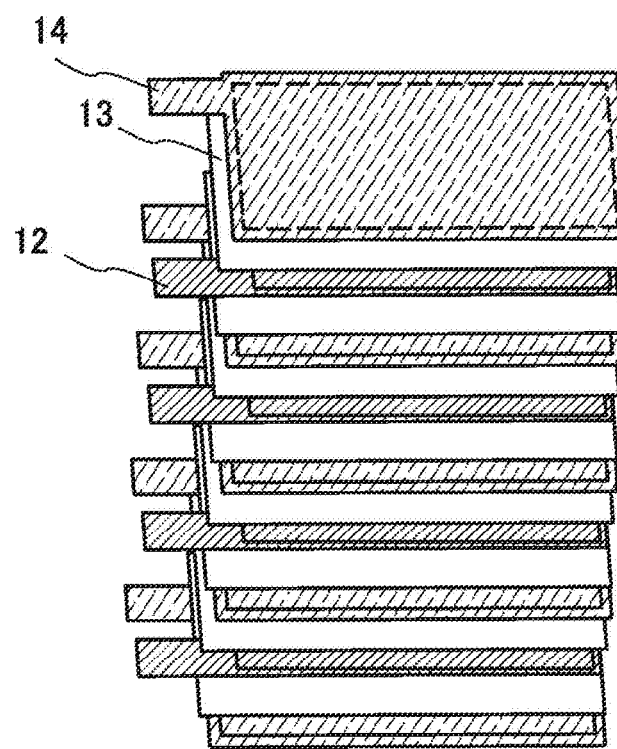

The negative electrode current collector may be sandwiched between negative electrode active material layers. FIG. 5B illustrates an example where three negative electrode current collectors each sandwiched between negative electrode active material layers, four positive electrode current collectors each sandwiched between positive electrode active material layers, and eight separators are sandwiched between two negative electrode current collectors each having one surface that is provided with a negative electrode active material layer.

In the case of thus stacking layers, four positive electrode current collectors are all fixed and electrically connected at a time by ultrasonic welding. Furthermore, when ultrasonic welding is performed with the four positive electrode current collectors overlapping with a lead electrode, they can be electrically connected efficiently.

A protruding portion of a positive electrode current collector is also called a tab portion. Ultrasonic welding can be performed in such a manner that ultrasonic waves are emitted to the tab portion of the positive electrode current collector placed so as to overlap with a tab portion of another positive electrode current collector, while pressure is applied thereto.

The tab portion is likely to be cracked or cut by stress due to external force applied after fabrication of a secondary battery.

Figure 6A:
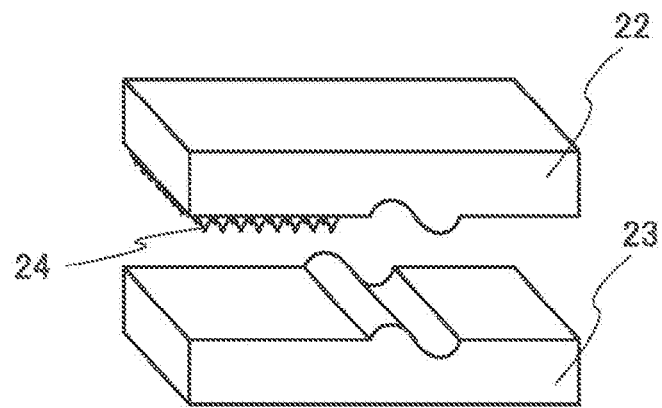
FIGS. 6A and 6B are perspective views illustrating one embodiment of the present invention.

Thus, an ultrasonic welding apparatus including bonding dies illustrated in FIG. 6A is used in this embodiment. Note that only top and bottom bonding dies of the ultrasonic welding apparatus are illustrated in FIG. 6A for simplicity.

Figure 6B:
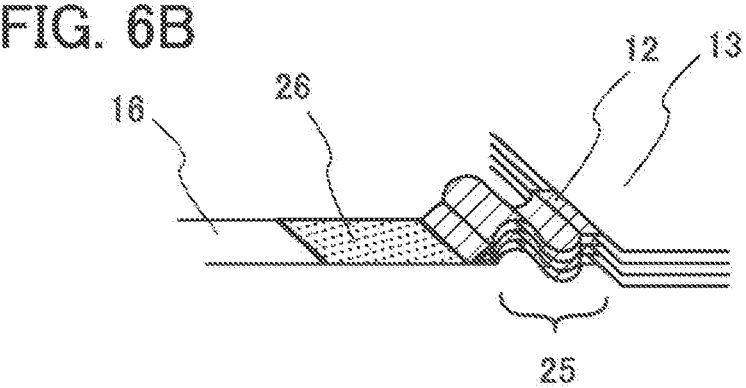

Tab portions of four positive electrode current collectors 12 and a lead electrode are positioned between a first bonding die 22 provided with projections 24 and a second bonding die 23. When ultrasonic welding is performed with a region that needs to be welded overlapping with the projections 24 and pressure is applied, a bent portion 25 is formed in the tab portion between a welded region 26 and a region of the tab portion protruding from an end portion of the separator 13, as illustrated in FIG. 6B.

This bent portion 25 can relieve stress due to external force applied after fabrication of a secondary battery. Such a structure as can relieve a strain caused by stress can prevent the secondary battery (e.g., an exterior body) from being damaged when changed in form by being bent, for example, achieving long-time reliability.

Furthermore, the ultrasonic welding apparatus including the bonding dies illustrated in FIG. 6A can perform ultrasonic welding and form the bent portion 25 at a time; thus, a secondary battery can be fabricated without increasing the number of fabricating steps. Note that ultrasonic welding and forming the bent portion 25 may be separately performed.

In addition, tab portions of five negative electrode current collectors are also all welded to be electrically connected by ultrasonic welding described above.

The bent portion 25 is not necessarily formed in the tab portion. To relieve stress, the shape of the tab portion of the positive electrode current collector may be modified. Such a structure as can relieve a strain caused by stress can prevent the secondary battery (e.g., an exterior body) from being damaged when changed in form by being bent, for example, achieving long-time reliability.

Figure 7A:
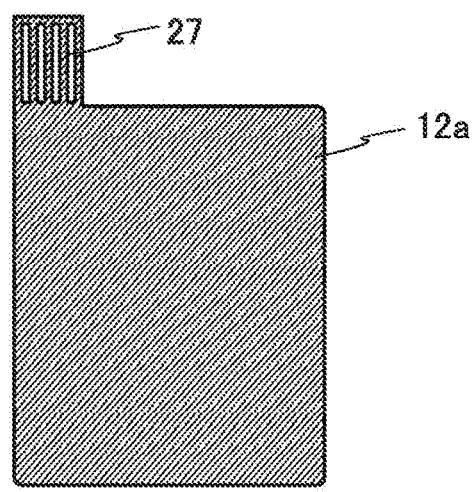
FIGS. 7A and 7B are top views each illustrating an embodiment of the present invention.

FIG. 7A illustrates an example of a top view of a positive electrode current collector 12a as a modification example. A tab portion of the positive electrode current collector 12a may be provided with slits 27 so that stress due to external force applied after fabrication of a secondary battery can be relieved. Such a structure as can relieve a strain caused by stress can prevent the secondary battery (e.g., an exterior body) from being damaged when changed in form by being bent, for example, achieving long-time reliability.

Figure 7B:
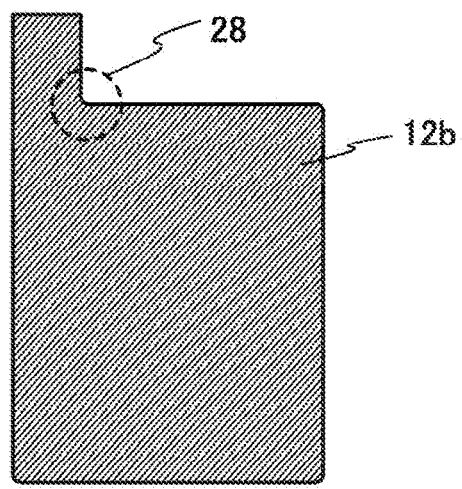

FIG. 7B illustrates an example of a top view of a positive electrode current collector 12b as another modification example. A corner of a region 28, which is surrounded by a dotted line, of a tab portion of the positive electrode current collector 12b is rounded off to relieve concentration of stress. Furthermore, the corner of the region 28 is preferably more rounded off than the other corners to have a large radius of curvature.

Alternatively, a high-strength material such as stainless steel may be used for a positive electrode current collector and the positive electrode current collector may be formed to have 10 μm or less, in order to relieve stress due to external force applied after fabrication of a secondary battery.

It is needless to say that two or more of the above examples may be combined to relieve concentration of stress in the tab portion.

Note that this embodiment can be combined with Embodiment 1.

Embodiment 3

In this embodiment, an experiment where a secondary battery is fabricated and repetitively bent with a radius of curvature of 40 mm to 150 mm inclusive will be described. It is found that the repetitively bending the secondary battery with a radius of curvature of 40 mm to 150 mm inclusive causes no problem.

First, a secondary battery is fabricated using the embossed film 10 according to Embodiment 1.

Figure 8A:
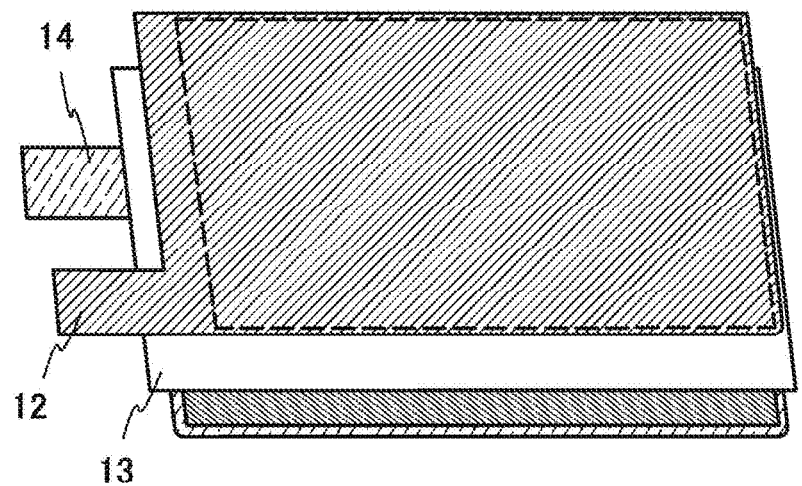
FIGS. 8A and 8B are perspective views each illustrating one embodiment of the present invention.
Figure 8B:
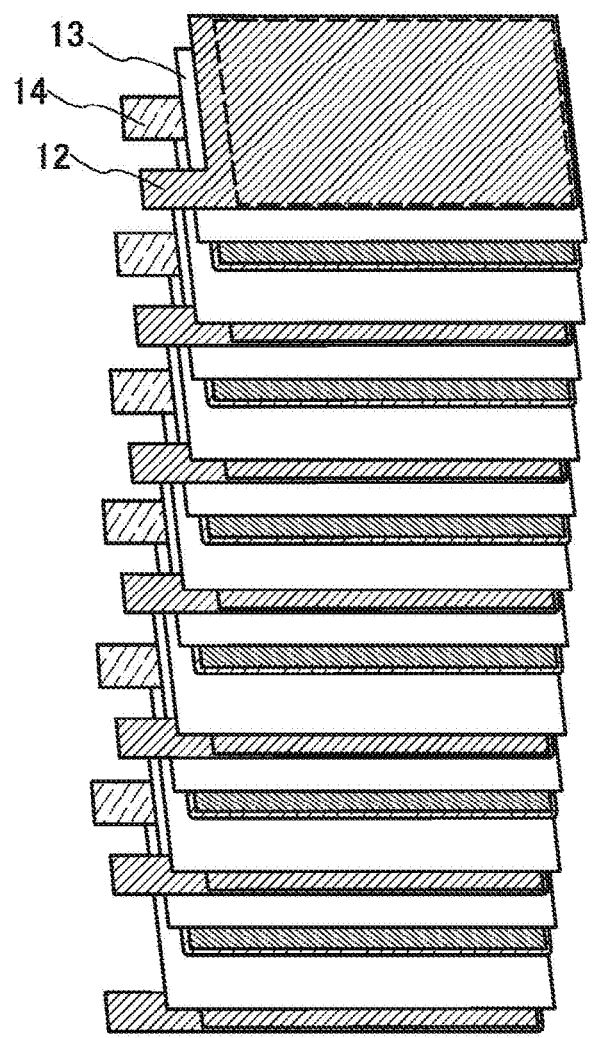

In this embodiment, six combinations in each of which the positive electrode current collector 12, the separator 13, and the negative electrode current collector 14 are stacked as illustrated in FIG. 8A are used and wrapped with an exterior film. A positive electrode having one surface provided with a positive electrode active material layer and a negative electrode having one surface provided with a negative electrode active material layer are used. Specifically, the positive electrode having one surface provided with the positive electrode active material layer, the separator to be in contact with the positive electrode active material layer, the negative electrode having one surface provided with the negative electrode active material layer that is to be in contact with the separator, and the negative electrode current collector to be in contact with the negative electrode active material layer are stacked in this order. Although 12 separators are illustrated in FIG. 8B, only six separators are used in the case where one separator is folded and the positive electrode current collector 12 is placed inside the folded separator.

According to Embodiment 2, six positive electrode current collectors and a lead electrode are welded by ultrasonic welding with the use of an ultrasonic welding apparatus including the bonding dies illustrated in FIG. 6A. In addition, six negative electrode current collectors and a lead electrode are welded by ultrasonic welding.

Then, the outer edge of the exterior film except a part for introducing an electrolytic solution is subjected to thermocompression bonding according to Embodiment 1, a predetermined amount of electrolytic solution is introduced into a space surrounded by the film in an inert atmosphere, and the part of the outer edge of the exterior film that has not yet been subjected to thermocompression bonding and is left open is sealed by thermocompression bonding. The thickness of a thickest portion of the lithium-ion secondary battery obtained in this manner (the total thickness including the thickness of an exterior body) is approximately 3 mm.

Figure 9A:
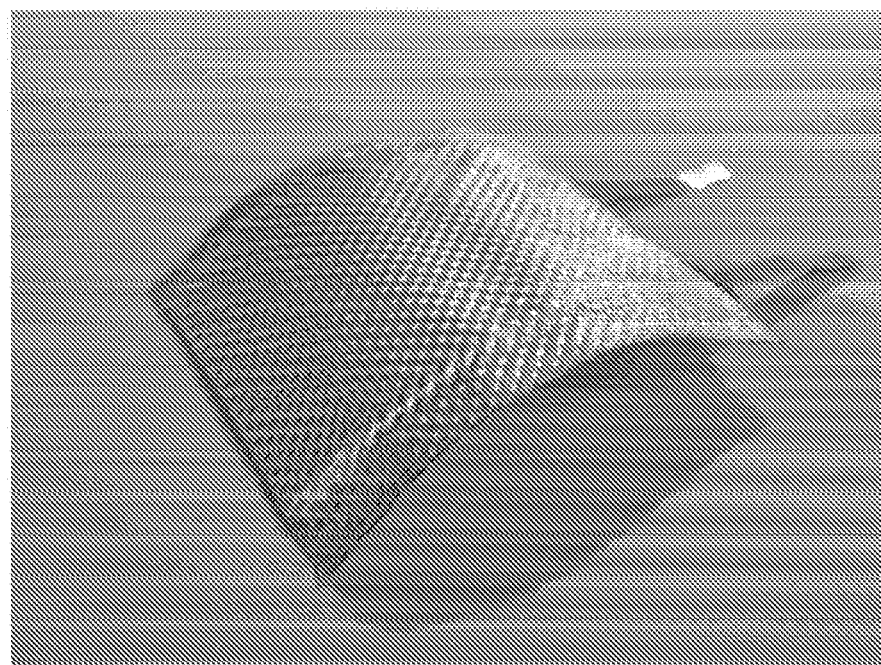
FIG. 9A is an external photograph of a secondary battery of one embodiment of the present invention.
Figure 9B:
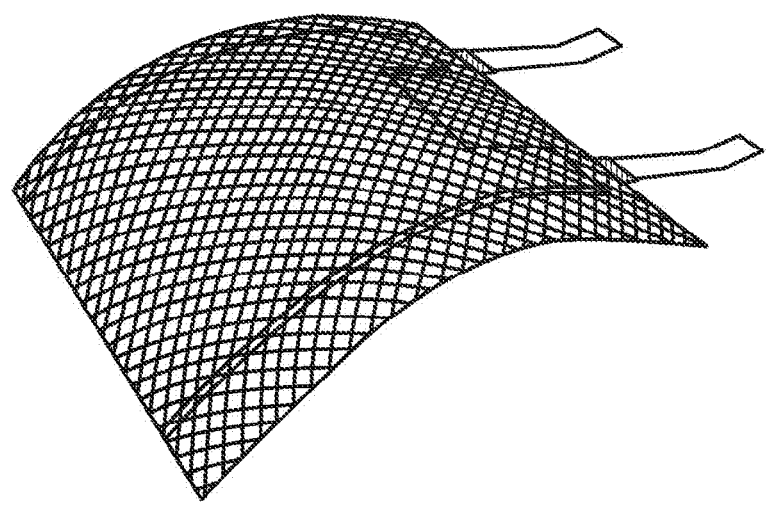
FIG. 9B is a schematic view thereof.

FIG. 9A is a photograph taken while the lithium-ion secondary battery is bent. FIG. 9B is a schematic view thereof. A bending test of the lithium-ion secondary battery is performed, and it is confirmed that bending the secondary battery with a radius of curvature of 40 mm to 150 mm inclusive 10000 times causes no problem and the secondary battery can be charged and discharged. It is needless to say that an external body and the like are not damaged and leakage or the like of an electrolytic solution and the like does not occur. The film serving as the exterior body has a surface provided with a plurality of projections and depressions; thus, wrinkles are not easily formed and concentration of stress is suppressed when the secondary battery is changed in form by being bent. This helps prevent damage to the film. In the case where the film does not have a surface provided with a plurality of projections and depressions, large wrinkles are concentrated at a bent portion when the secondary battery is changed in form by being bent. As a result, a hole might be formed and an electrolytic solution might leak out, or a portion of an adhesive layer at which the wrinkles are concentrated might be damaged and an electrolytic solution might leak out from a crack formed in the adhesive layer.

Figure 10A:
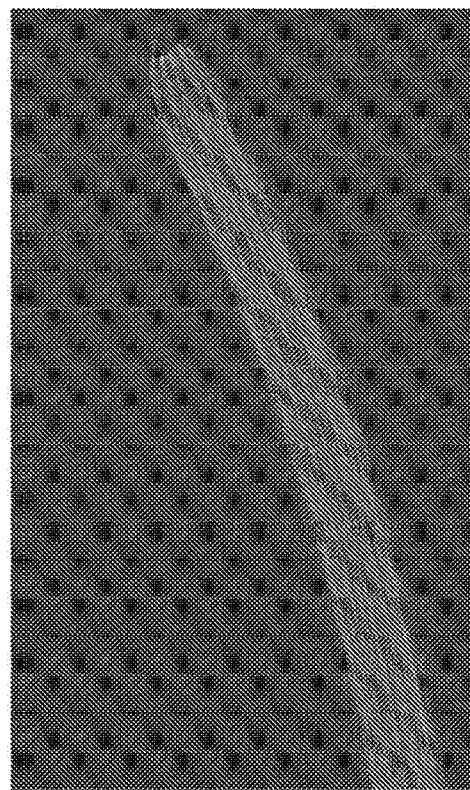
FIG. 10A is an X-ray photograph of a secondary battery of one embodiment of the present invention.
Figure 10B:
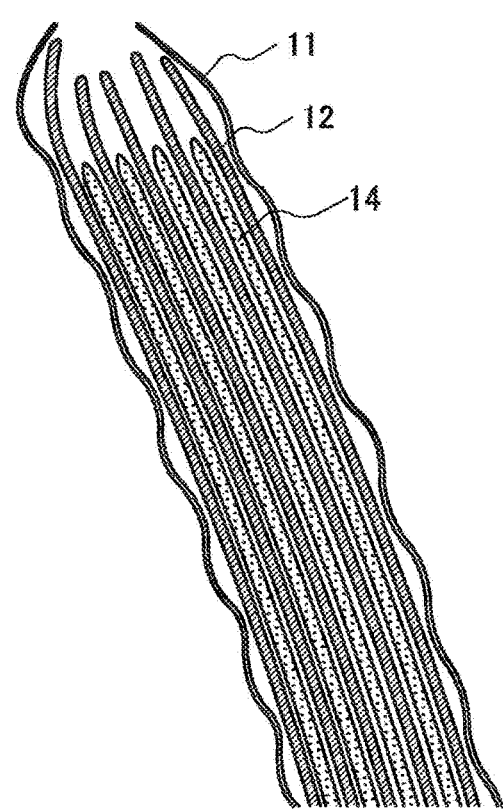
FIG. 10B is a schematic view thereof.

FIG. 10A is an X-ray CT image of a cross section of an end portion of the obtained lithium-ion secondary battery observed by an X-ray CT scanner after the lithium-ion secondary battery is bent with a radius of curvature of 40 mm to 150 mm inclusive 10000 times. FIG. 10B is a schematic view thereof. In FIG. 10A, a portion damaged by bending the secondary battery 10000 times is not found, which implies that charge and discharge can be performed without any problem. Note that an X-ray CT scanner is an apparatus in which a subject is exposed to X-rays and the X-rays transmitted through or scattered by the subject are detected by an X-ray detector, and a tomographic image of the subject is obtained on the basis of the X-ray detection output (the number of photons of the X-rays). With the X-ray CT scanner, a cross section of a secondary battery can be observed nondestructively.

In FIG. 10A, the exterior film 11, the positive electrode current collector 12, the negative electrode current collector 14 are made of metal materials and do not transmit X-rays. This allows a clear tomographic image of them in the secondary battery to be obtained. In contrast, the separator, the positive electrode active material layer, and the negative electrode active material layer transmit X-rays, and it is difficult to identify them in FIG. 10B.

It is also observed by the X-ray CT scanner that unevenness of a surface of the film is changed and stress is sufficiently relieved when the lithium-ion secondary battery is bent. Such a structure as can relieve a strain caused by stress can prevent the secondary battery (e.g., an exterior body) from being damaged when changed in form by being bent, for example, achieving long-time reliability.

Embodiment 4

In this embodiment, examples of electronic devices incorporating any of the lithium-ion secondary batteries described in Embodiments 1 to 3 will be described.

The secondary battery fabricated according to any of Embodiments 1 to 3 includes, as an exterior body, a thin film having flexibility, and thus can be attached to a support structure body with a curved surface by changing its form along the curved surface of the support structure body.

Figure 11A:
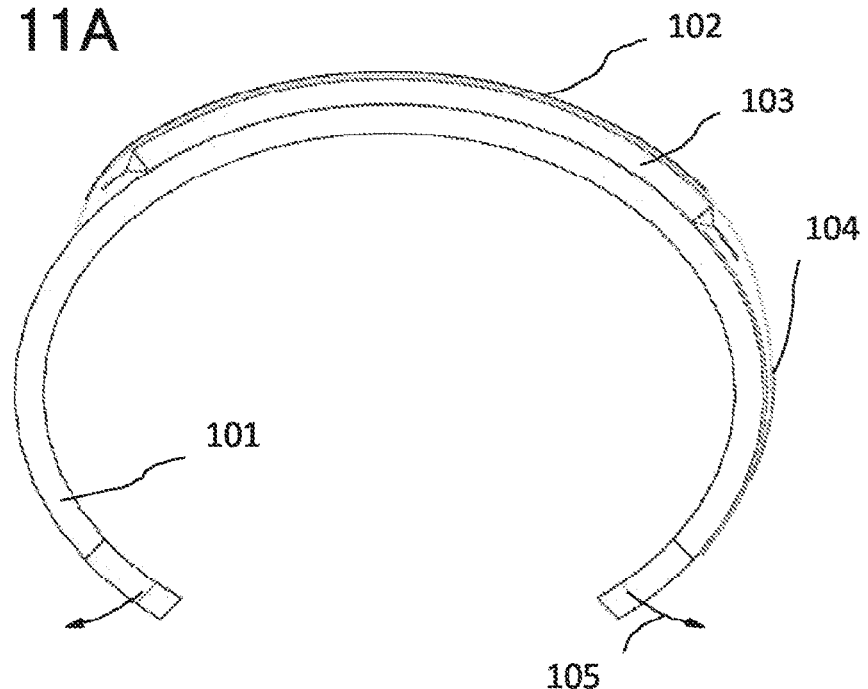
FIG. 11A is a cross-sectional view of an electronic device of one embodiment of the present invention.

Next, a display module to be attached to the secondary battery is prepared. The display module refers to a display panel provided with at least an FPC. FIG. 11A is a cross-sectional schematic view of an electronic device. The electronic device in FIG. 11A includes a display portion 102, an FPC, and a driver circuit and preferably further includes a converter for power feeding from a secondary battery 103. The support structure body 101 is in the form of a bracelet obtained by curving a band-like structure body. At least part of the support structure body 101 has flexibility and can be moved in the direction of arrows 105; thus, the electronic device can be put around a wrist.

In the display module, the display portion 102 is flexible and a display element is provided over a soft and flexible film. Examples of the soft and flexible film include a plastic film containing an organic material and an inorganic film containing an inorganic material. As an inorganic film, glass with a thickness small enough to have flexibility, specifically, a thickness of 20 μm to 200 μm inclusive, preferably 25 μm to 100 μm inclusive is used. Examples of glass include non-alkali glass, barium borosilicate glass, and aluminoborosilicate glass. When glass is used as the flexible film, a barrier property against water and oxygen can be improved, so that the lifetime of an organic EL element can be increased and a reliable light-emitting panel can be provided. Alternatively, a substrate in which a glass fiber is impregnated with an organic resin or a substrate whose thermal expansion coefficient is reduced by mixing an organic resin with an inorganic filler may be used. A substrate using such a material is lightweight, and thus a light-emitting panel using this substrate can also be lightweight. The secondary battery 103 and the display portion 102 are preferably disposed so as to partly overlap with each other. When the secondary battery 103 and the display portion 102 are disposed so as to partly or entirely overlap with each other, the electrical path, i.e., the length of a wiring, from the secondary battery 103 to the display portion can be shortened, whereby power consumption can be reduced.

Examples of methods for forming the display element over the flexible film include a method in which the display element is directly formed over the flexible film; a method in which a layer including the display element is formed over a rigid substrate such as a glass substrate, the substrate is removed by etching, polishing, or the like, and then the layer including the display element and the flexible film are attached to each other; and a method in which a separation layer is provided over a rigid substrate such as a glass substrate, a layer including the display element is formed thereover, the rigid substrate and the layer including the display element are separated from each other using the separation layer, and then the layer including the display element and the flexible film are attached to each other. Examples of the separation layer include a metal oxide film such as a tungsten oxide film, an organic resin film such as a polyimide film, and an amorphous silicon film. In the case of using an organic resin film such as a polyimide film or an amorphous silicon film as the separation layer, separation is performed in such a manner that ablation is caused by irradiation with laser light.

Figure 11B:
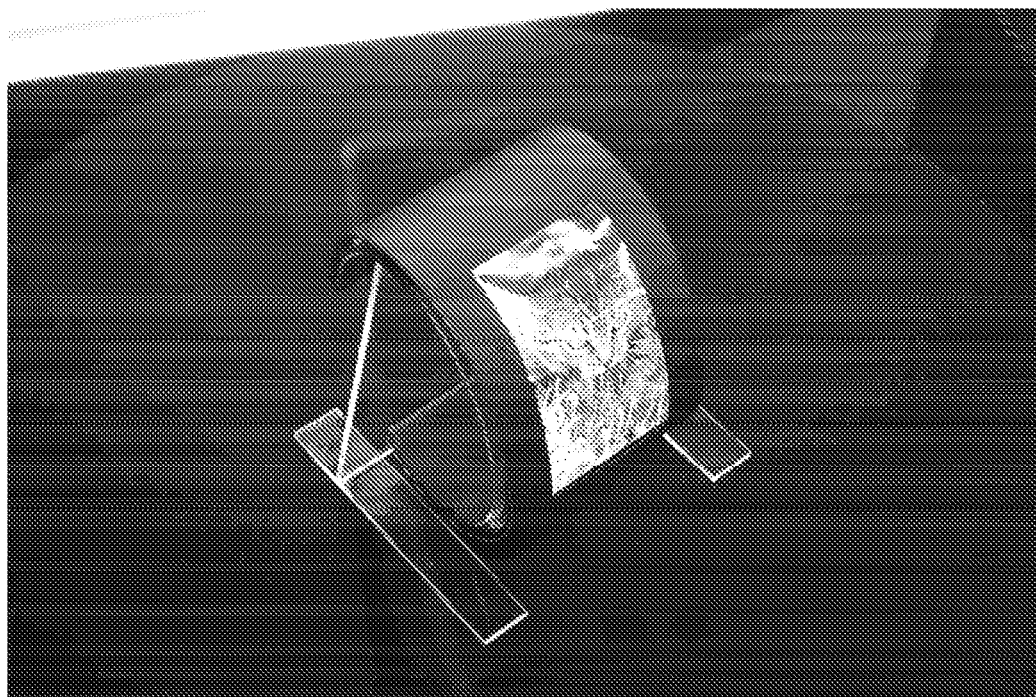
FIG. 11B is an external photograph thereof.

FIG. 11B is a photograph of an electronic device that can display an image on a display portion. The electronic device shown in FIG. 11B is light when worn on an arm (e.g., a forearm). In addition, the electronic device presents an appearance with an attractive design and can thus also be used as an accessory.

Figure 12A:
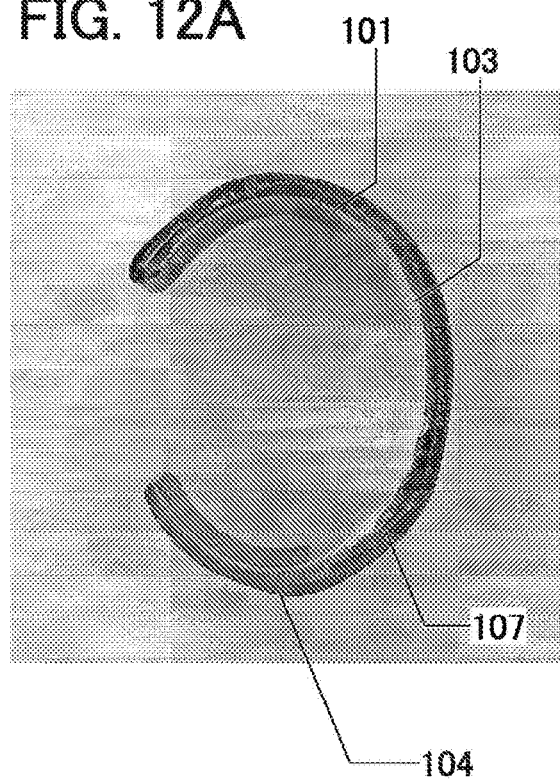
FIGS. 12A and 12B are external photographs of an electronic device of one embodiment of the present invention.
Figure 12B:
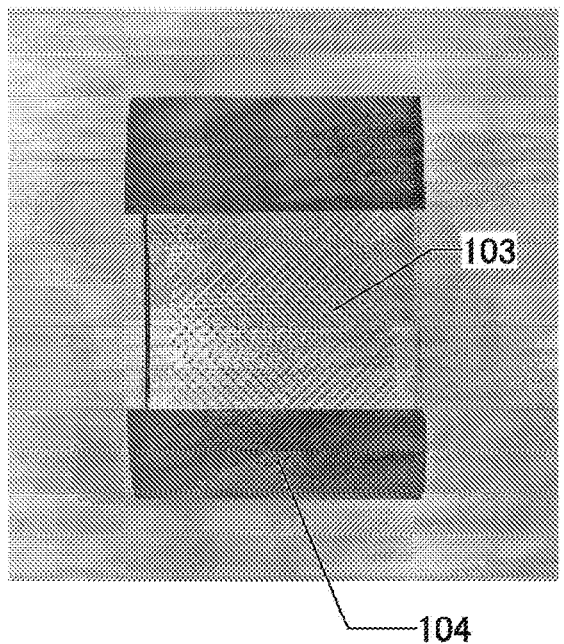

FIG. 12A is a photograph of a side surface of an electronic device. FIG. 12B is a photograph of the electronic device taken so that the secondary battery can be seen. As in FIG. 12B, the electronic device includes a light-transmitting plastic substrate as the support structure body 101 and thus the secondary battery 103 can be visually recognized from the back surface side of the electronic device and a surface of an embossed film can be observed.

The electronic device illustrated in FIG. 12A includes the support structure body 101, the secondary battery 103, a control board 107, and a cover 104. The control board 107 is an insulating wiring board on which a semiconductor element, a resistor, a capacitor, and the like are mounted. The insulating wiring board is formed by binding ceramic powder of aluminum oxide, silicon oxide, calcium oxide, or the like with an organic polymer material. Specifically, the secondary battery 103, the control board 107, and the cover 104 are provided in this order over the support structure body 101. In addition, the electronic device is provided with an antenna (not shown) for wireless charging, and the wireless charging can be performed according to the Qi standard.

The support structure body 101 is flexible and thus can be easily bent. Note that a material other than plastic can be used for the support structure body 101.

The control board 107 has slits to bend it, and is provided with a communication device conforming to Bluetooth (registered trademark, the same as IEEE802.15.1) standards, a microcomputer, a storage device, an FPGA, a DA converter, a charge control IC, a level shifter, and the like. In addition, the control board 107 is connected to a display module including a display portion through an input/output connector.

In addition, the display portion may be provided with a touch panel so that input of data to the electronic device and operation of the electronic device can be performed with the touch panel. The display portion may have a structure where a first film is provided with a light-emitting element, a second film is provided with a touch sensor, the second film serves as a sealing plate, and the first film and the second film are bonded with the light-emitting element and the touch sensor positioned therebetween. In the case of providing a touch panel separately from the display portion, the touch panel is formed by providing a touch sensor over a bendable film. In addition, a buffer layer such as a resin layer may be provided between the touch panel and the display portion. To protect the touch panel from being damaged, a surface of the touch panel may be provided with a protective layer such as a protective film or a resin layer.

Figure 17A:
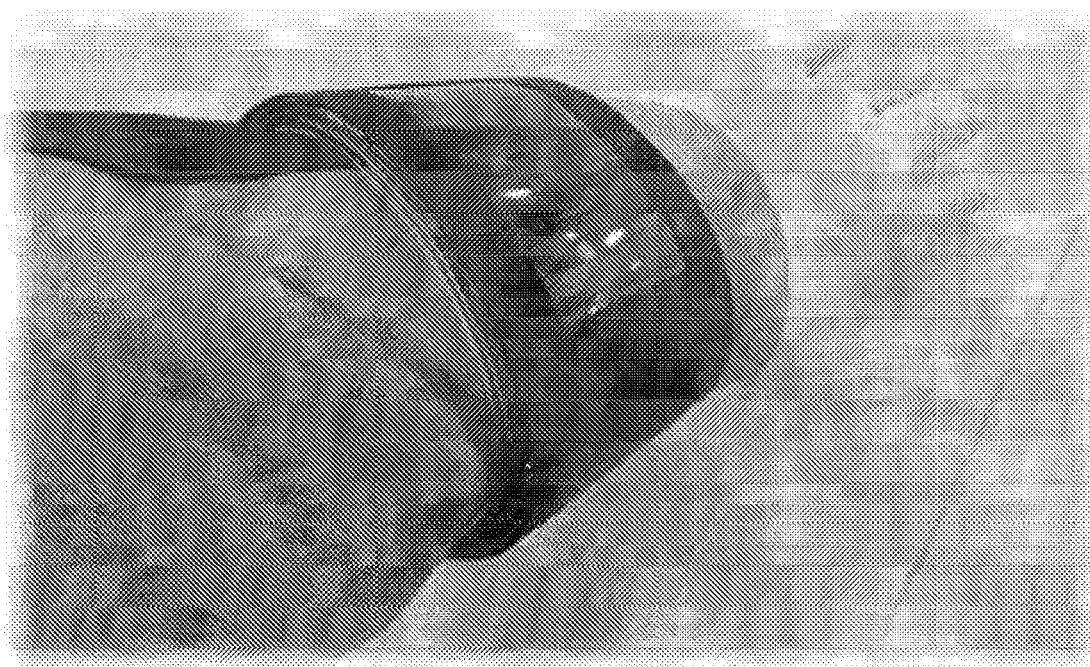
FIGS. 17A to 17C are external photographs of an electronic device of one embodiment of the present invention.
Figure 17B:
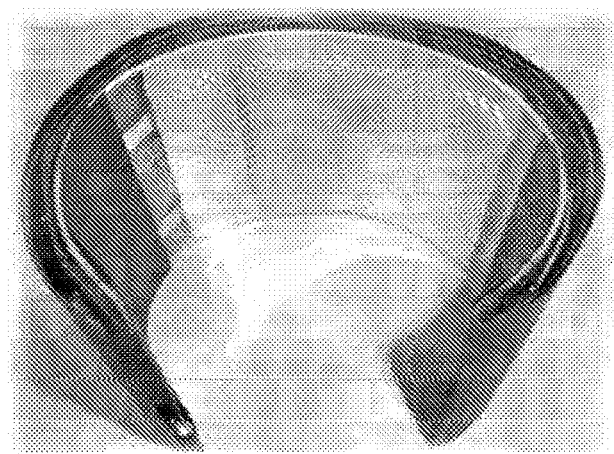
Figure 17C:
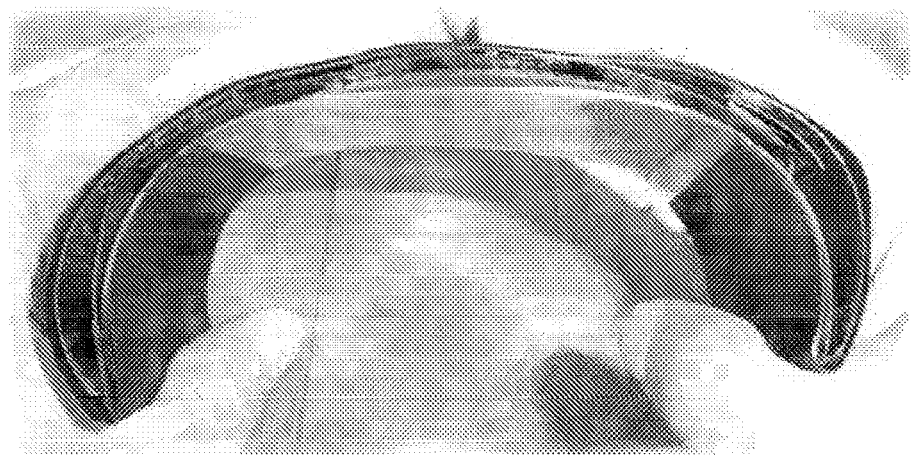

FIG. 17A is a photograph showing the state where a user wears an electronic device on his or her arm. A display portion is an active matrix display device and includes a transistor including an oxide semiconductor layer and an organic EL element electrically connected to the transistor. The electronic device has a good design as in FIG. 17A and thus can be used as an accessory. FIG. 17B is a photograph of the electronic device taken from the back side thereof. FIG. 17C is a photograph of the electronic device that is changed in form by hand.

Figure 18:
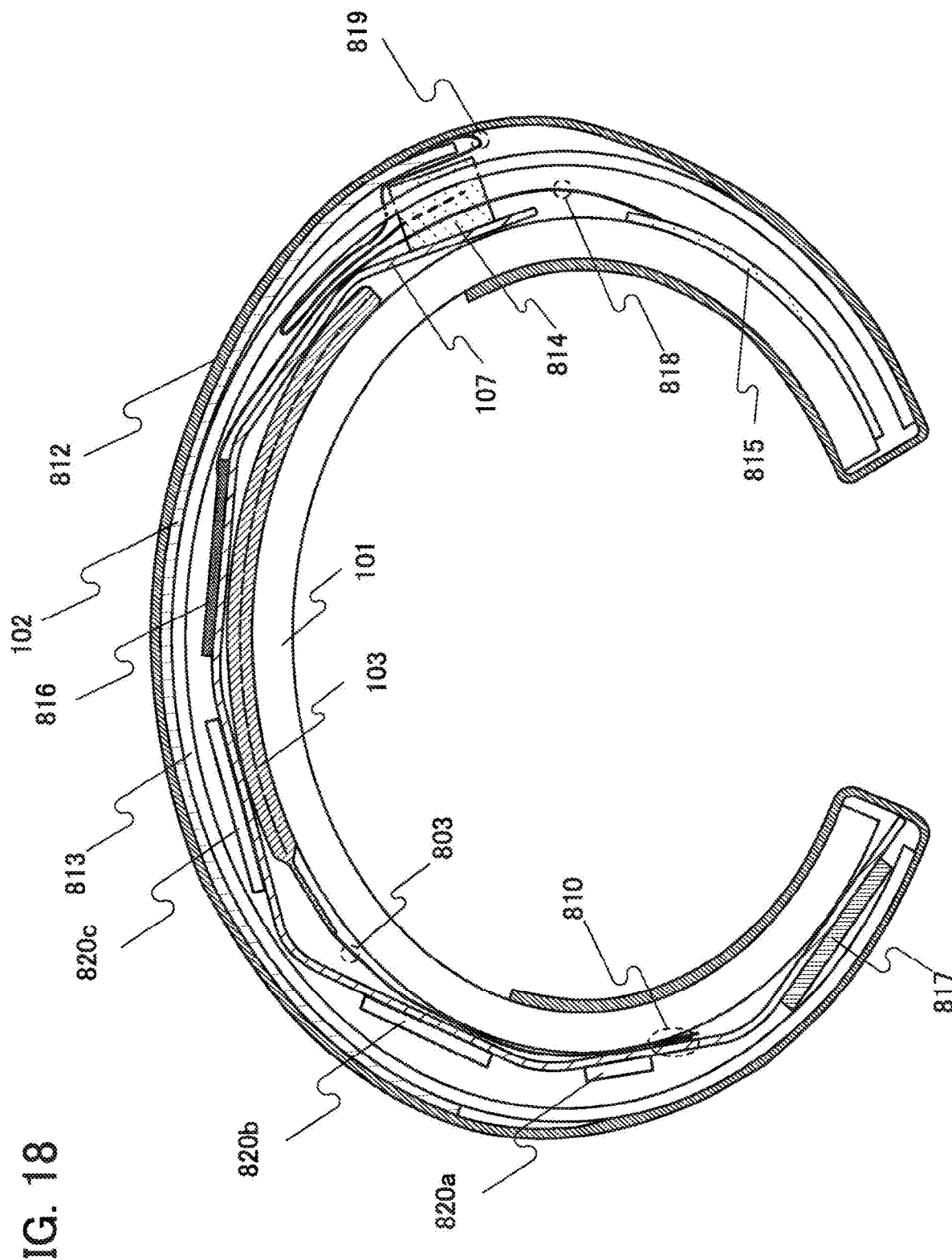
FIG. 18 is a schematic cross-sectional view of FIG. 12A.
Figure 19A:
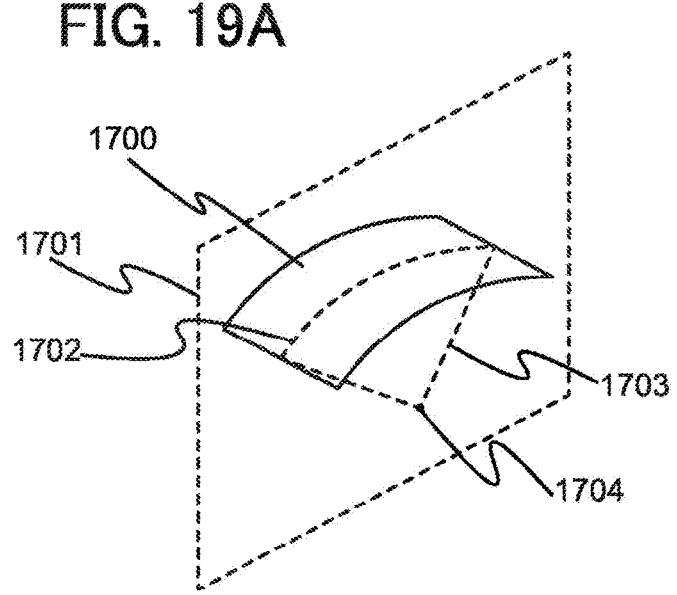
FIGS. 19A to 19C illustrate a radius of curvature of a surface.
Figure 19B:
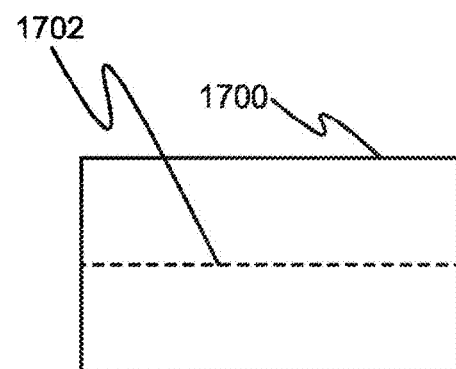
Figure 19C:
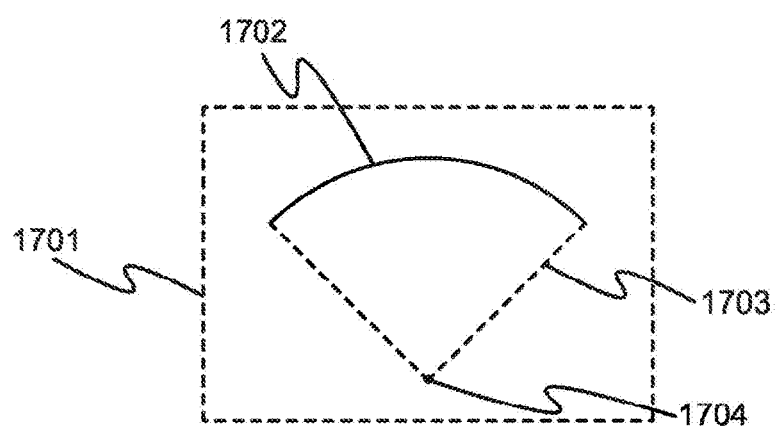
Figure 20A:
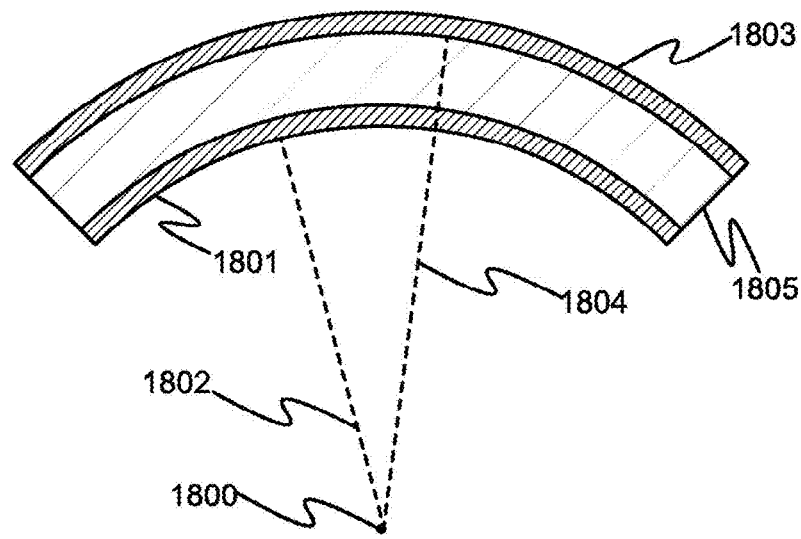
FIGS. 20A to 20D illustrate a center of curvature.
Figure 20B:
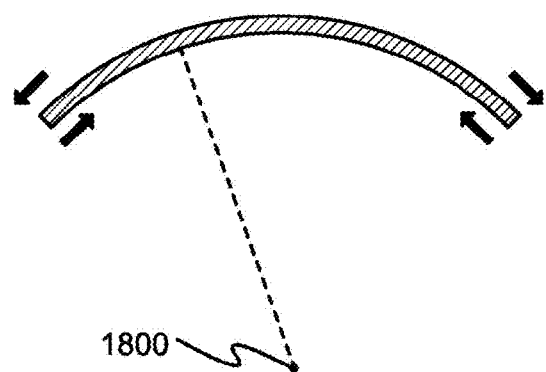
Figure 20C:
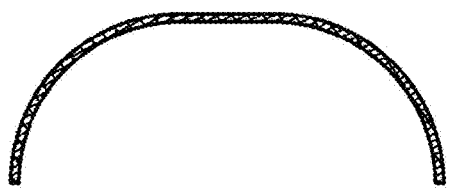
Figure 20D:
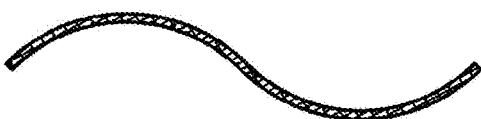

FIG. 18 is a structural schematic diagram of a side surface of the electronic device and is an enlarged schematic diagram of the photograph in FIG. 12A.

The electronic device in FIG. 18 includes the support structure body 101, the secondary battery 103, the control board 107, the display portion 102, a protective member 813, and a cover 812. Specifically, the secondary battery 103, the control board 107, and the protective member 813 whose thickness is approximately one third of the thickness of the support structure body 101, and the display portion 102 and the cover 812 are provided in this order over the support structure body 101. In addition, the electronic device is provided with an antenna 815 for wireless charging, and the wireless charging can be performed according to the Qi standard. The electronic device includes a communication device 817 for wirelessly communicating data to be used to perform display with an external device.

The secondary battery 103 fabricated according to Embodiment 1 includes, as an exterior body, a thin flexible film that is embossed. The secondary battery 103 is provided over the support structure body 101 having a curved surface (may be bonded to the support structure body 101 having a curved surface) and can change its form along the curved surface of a region of the support structure body 101 that has a large radius of curvature.

The support structure body 101 is flexible and thus can be easily bent. Note that a material other than plastic can also be used for the support structure body 101. The support structure body 101 is in the form of a bracelet obtained by curving a band-like structure body. The support structure body 101 may have a cross-sectional shape with a uniform radius of curvature but preferably has a cross-sectional shape with different radii of curvature because the electronic device is worn on an arm. In the cross section of the support structure body 101, a region with a large radius of curvature, that is, a region overlapping with the display portion is sandwiched between two regions with a small radius of curvature as illustrated in FIG. 18. Thus, the support structure body 101 has a cross-sectional shape that fits a forearm (the cross-sectional shape of the support structure body 101 is an ellipse). In addition, the support structure body 101 is partly flexible, and the electronic device can be worn on a wrist while the support structure body 101 is changed in form. When the form of the electronic device is changed, misalignment between the support structure body 101 and the display portion 102 or between the support structure body 101 and the protective member 813 might occur. Even if misalignment occurs because of the charge in form, neither the display portion 102 nor the support structure body 101 is fixed and the protective member 813 keeps a space to prevent the control board 107 and the display portion 102 from being in contact with each other. That is, an air buffer layer is provided as a buffer layer between the control board 107 and the protective member 813. Furthermore, a sealant that is in contact with the support structure body is preferably provided to prevent entry of water and dust from a side surface of the electronic device. This sealant preferably prevents entry of water and dust when the electronic device is changed in form, and thus is preferably made of a flexible material (an elastic resin such as a polyurethane resin, an acrylic resin, a silicone resin, an epoxy resin, and a resin containing polybutadiene as a main component).

The protective member 813 protects a component inside the electronic device, in particular, the control board 107 from a sudden shock. The protective member 813 has an opening for passing the FPC 819 therethrough, and also serves as a support body of the display portion to maintain the curvature of a display screen because the display portion is thin. The protective member 813 can change its form as a part of the electronic device and thus can be made of a material similar to that of the support structure body 101. Note that the protective member 813 may be made of a material different from that of the support structure body 101.

The cover 812 is a light-blocking film having one surface coated with an adhesive and covers part of the electronic device to bring components together and has an opening overlapping with the display portion 102. The cover 812 can conceal the internal structure owing to its light-blocking property, improving the design of the electronic device. Note that the electronic device may be intentionally formed so that its internal structure can be seen externally. In that case, the cover 812 does not have to have a light-blocking property. Also in the case where the protective member 813 has a light-blocking property, the cover 812 does not have to have a light-blocking property.

The control board 107 has slits to bend it, and is provided with the communication device 817 conforming to Bluetooth (registered trademark, the same as IEEE802.15.1) standards, a microcomputer, a storage device, an FPGA, a DA converter, a charge control IC, a level shifter, and the like. ICs 820a, 820b, and 820c (e.g., a microcomputer, a storage device, an FPGA, a DA converter, a charge control IC, and a level shifter) and the like are mounted on flat surfaces each of which is between the slits of the control board 107 as illustrated in FIG. 18. The control board 107 is connected to a display module including the display portion 102 through an input/output connector 814. In addition, the control board 107 is connected to the antenna 815 through a wiring 818 and connected to the secondary battery 103 through a lead electrode 803 and a connection portion 810. A power supply control circuit 816 controls charge and discharge of the secondary battery 103.

The display module refers to a display panel provided with at least an FPC 819. The electronic device in FIG. 18 includes the display portion 102, the FPC 819, and a driver circuit and further includes a converter for power feeding from the secondary battery 103.

The secondary battery 103 and the display portion 102 are preferably disposed so as to partly overlap with each other. When the secondary battery 103 and the display portion 102 are disposed so as to partly or entirely overlap with each other, the electrical path, i.e., the length of a wiring, from the secondary battery 103 to the display portion 102 can be shortened, whereby power consumption can be reduced. In addition, providing the display module between the protective member 813 and the cover 812 enables protection of the display module from unexpected deformation (e.g., wrinkles or a twist), increasing the lifetime of the electronic device as a product.

FIGS. 13A to 13H illustrate examples of other electronic devices.

Examples of electronic devices each using a flexible power storage device are as follows: head-worn display devices such as head-mounted displays and goggle type displays, arm-worn display devices, stationary display devices (also referred to as televisions or television receivers), desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of an automobile.

Figure 13A:
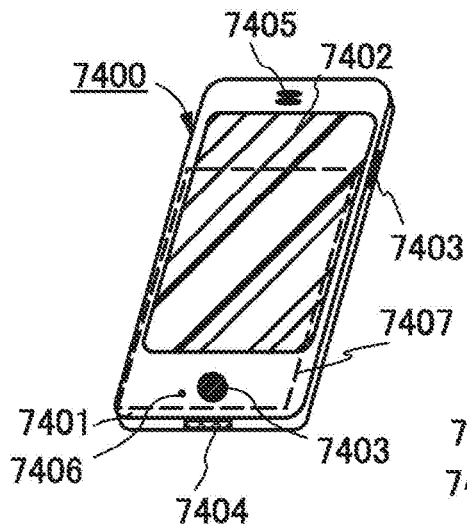
FIGS. 13A to 13H illustrate electronic devices including flexible secondary batteries.

FIG. 13A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 13B:
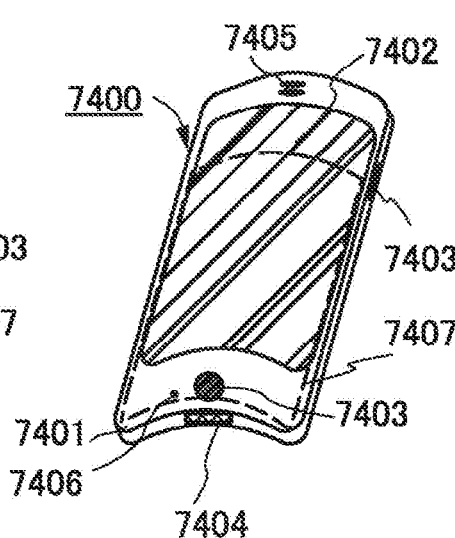
Figure 13C:
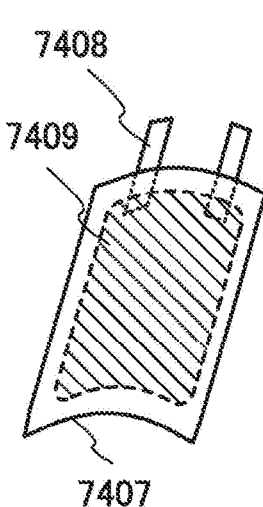

FIG. 13B illustrates the mobile phone 7400 that is bent. When the whole mobile phone 7400 is bent by external force, the power storage device 7407 included in the mobile phone 7400 is also bent. FIG. 13C illustrates the bent power storage device 7407. The power storage device 7407 is a laminated storage battery (also referred to as a layered battery or a film-covered battery). The power storage device 7407 is fixed while being bent. Note that the power storage device 7407 includes a lead electrode 7408 electrically connected to a current collector 7409. For example, a film serving as an exterior body of the power storage device 7407 is embossed, so that the power storage device 7407 has high reliability even when bent. The mobile phone 7400 may further be provided with a slot for insertion of a SIM card, a connector portion for connecting a USB device such as a USB memory.

Figure 13D:
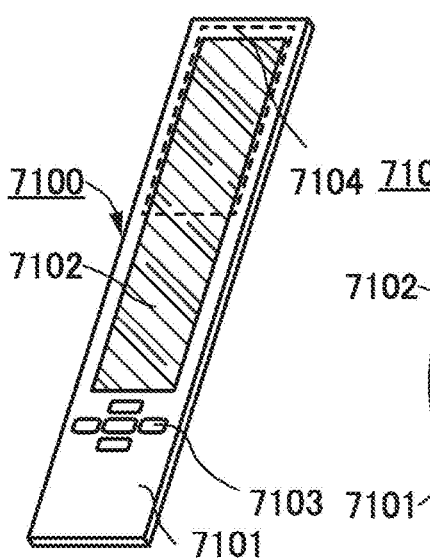
Figure 13E:
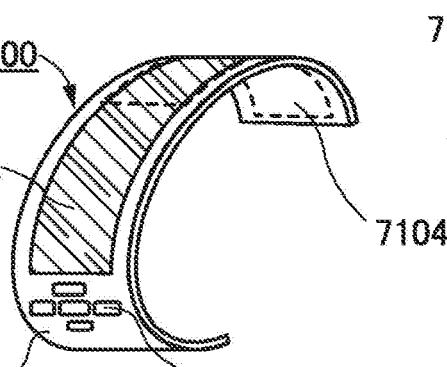
Figure 13F:
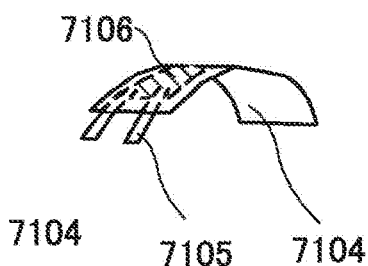
Figure 13G:
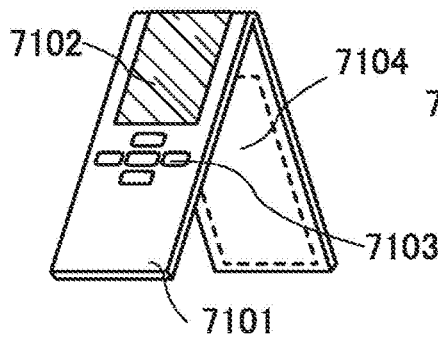
Figure 13H:
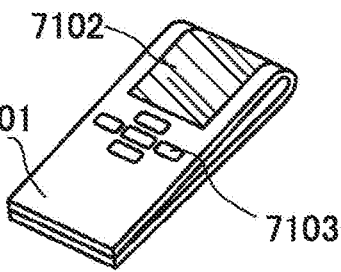

FIG. 13B illustrates an example of a mobile phone that can be bent. When bent to be put around a forearm, the mobile phone can be used as a bangle-type mobile phone as in FIG. 13E. The bangle-type mobile phone illustrated in FIG. 13E can also be referred to as an arm-worn display device. A mobile phone 7100 includes a housing 7101, a display portion 7102, an operation button 7103, and a power storage device 7104. FIG. 13F illustrates the power storage device 7104 that can be bent. When the mobile phone is worn on a user's arm while the power storage device 7104 is bent, the housing changes its form and the curvature of a part or the whole of the power storage device 7104 is changed. Specifically, a part or the whole of the housing or the main surface of the power storage device 7104 is changed in the range of radius of curvature from 10 mm to 150 mm. Note that the power storage device 7104 includes a lead electrode 7105 that is electrically connected to a current collector 7106. For example, pressing is performed to form a plurality of projections and depressions on a surface of the film serving as the exterior body of the power storage device 7104, and retains high reliability even when the power storage device 7104 is bent many times with different curvatures. The mobile phone 7100 may further be provided with a slot for insertion of a SIM card, a connector portion for connecting a USB device such as a USB memory. When a center portion of the mobile phone illustrated in FIG. 13D is folded, a form illustrated in FIG. 13G can be obtained. When a center portion of the mobile phone is further folded so that end portions of the mobile phone overlap with each other as illustrated in FIG. 13H, the mobile phone can be reduced in size so as to be put in, for example, a pocket of clothes a user wears. As described above, the mobile phone illustrated in FIG. 13D can be changed in form in more than one ways, and it is desirable that at least the housing 7101, the display portion 7102, and the power storage device 7104 have flexibility in order to change the form of the mobile phone.

Figure 16A:
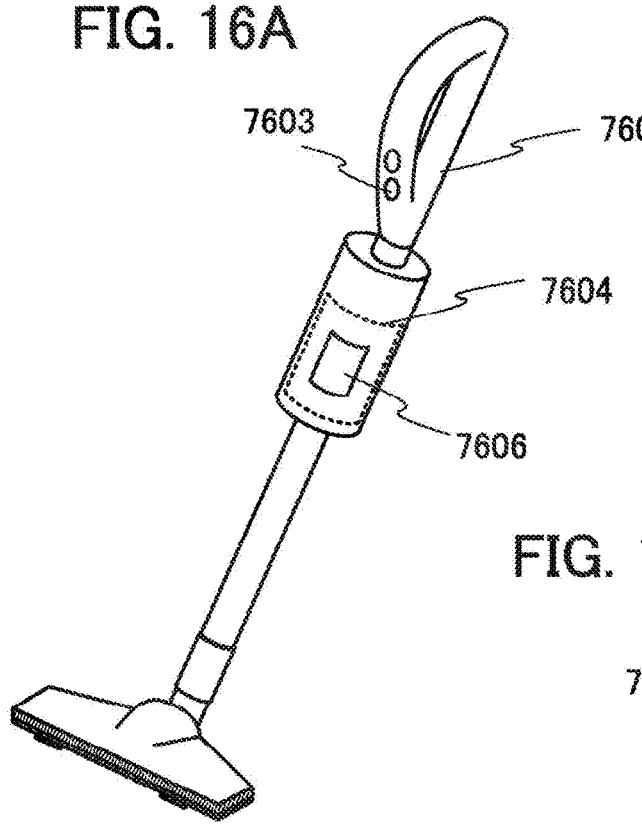
FIGS. 16A to 16D each illustrate an electronic device.

FIG. 16A illustrates an example of a vacuum cleaner. By being provided with a secondary battery, the vacuum cleaner can be cordless. To secure a dust collecting space for storing vacuumed dust inside the vacuum cleaner, a space occupied by a power storage device 7604 is preferably as small as possible. For this reason, it is useful to provide the thin power storage device 7604 that can be bent, between the outside surface and the dust collecting space.

Figure 16B:
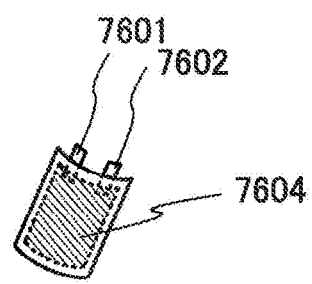

The vacuum cleaner 7600 is provided with operation buttons 7603 and the power storage device 7604. FIG. 16B illustrates the power storage device 7604 that is capable of being bent. A film serving as an exterior body of the power storage device 7604 is embossed, so that the power storage device 7604 has high reliability even when bent. The power storage device 7604 includes a lead electrode 7601 electrically connected to a negative electrode and a lead electrode 7602 electrically connected to a positive electrode.

Figure 16C:
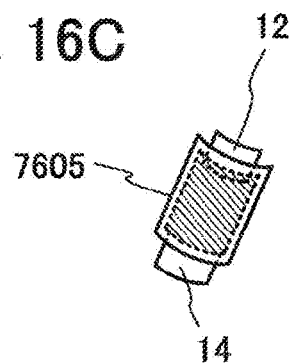

As another example of the power storage device 7604 where two lead electrodes are exposed from one short side of an exterior body, the power storage device 7605 that is capable of being bent is illustrated in FIG. 16C. The power storage device 7605 has a structure where a current collector and a lead electrode are exposed from two respective short sides of an exterior body. A film serving as the exterior body of the power storage device 7605 may also be embossed, in which case the power storage device 7605 can be bent and have high reliability.

Figure 16D:
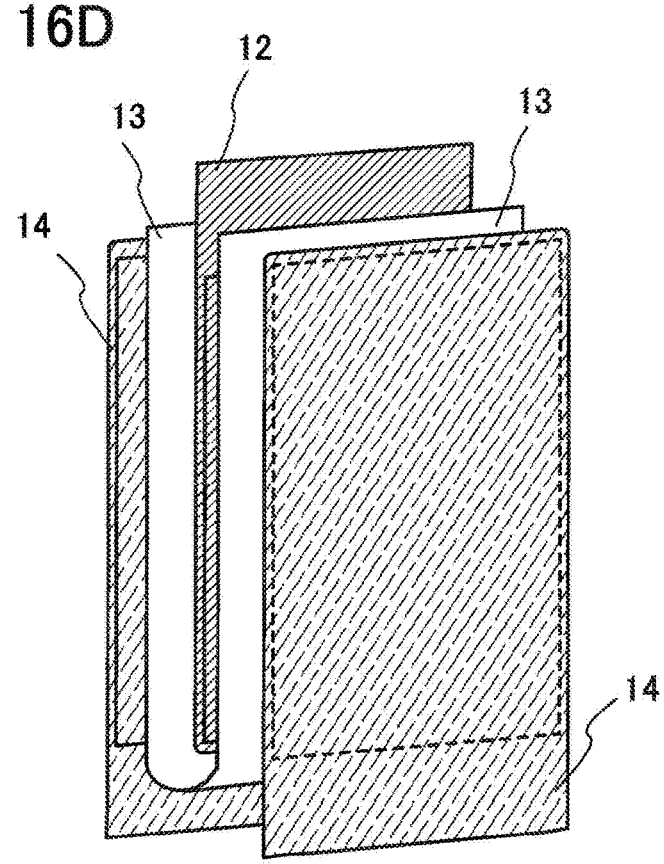

FIG. 16D illustrates an example of the internal structure of the power storage device 7605. As illustrated in FIG. 16D, the power storage device 7605 includes the positive electrode current collector 12, the separator 13, and two negative electrode current collectors 14. The two negative electrode current collectors 14 have slits that extend in the direction perpendicular to the direction in which the power storage device 7605 is bent. The separator 13 is folded and the positive electrode current collector 12 is provided inside the folded separator 13. In addition, the positive electrode current collector 12 is sandwiched between positive electrode active material layers.

The thin power storage device 7604 can be fabricated by the method for fabricating a laminated secondary battery that is described in Embodiment 1 or 2.

The thin power storage device 7604 has a laminated structure and is bent and fixed. The vacuum cleaner 7600 includes a display portion 7606 that displays, for example, the remaining amount of power in the thin power storage device 7604. A display area of the display portion 7606 is curved to fit the shape of the outer surface of the vacuum cleaner. The vacuum cleaner includes a connection cord for being connected to a receptacle. When the thin power storage device 7604 is charged to have sufficient power, the connection cord can be removed from the receptacle to use the vacuum cleaner. The thin power storage device 7604 may be charged wirelessly without using the connection cord.

The use of power storage devices that can be bent in vehicles enables production of next-generation clean energy vehicles such as hybrid electric vehicles (HEVs), electric vehicles (EVs), and plug-in hybrid electric vehicles (PHEVs). Moreover, power storage devices that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 14A:
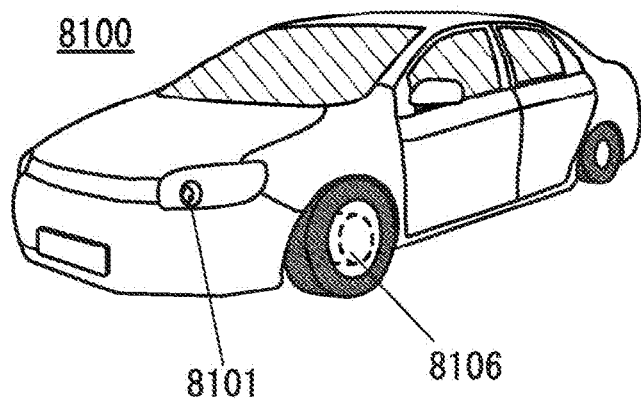
FIGS. 14A and 14B illustrate vehicles including secondary batteries.
Figure 14B:
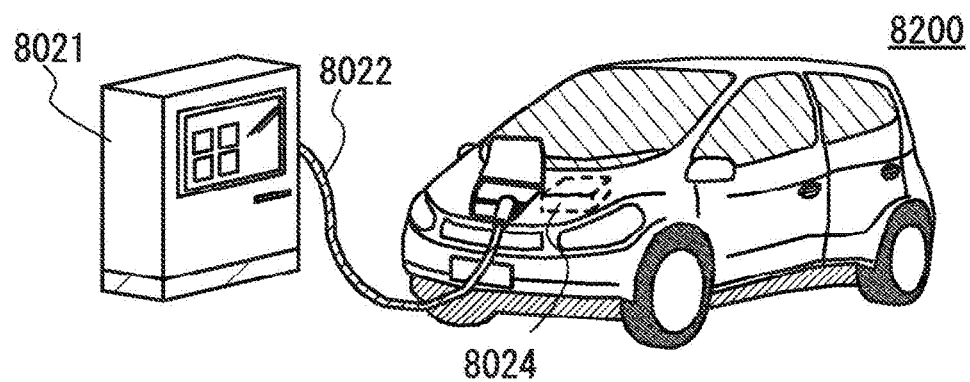

FIGS. 14A and 14B each illustrate an example of a vehicle fabricated according to one embodiment of the present invention. An automobile 8100 illustrated in FIG. 14A is an electric vehicle that runs on the power of an electric motor 8106. Alternatively, the automobile 8100 is a hybrid electric vehicle capable of driving using either the electric motor 8106 or the engine as appropriate. In the case of providing a laminated secondary battery in the vehicle, a battery module including a plurality of laminated secondary batteries is placed in one place or more than one place. According to one embodiment of the present invention, a power storage device itself can be made more compact and lightweight, and for example, when the power storage device having a curved surface is provided on the inside of a tire of a vehicle, the vehicle can be a high-mileage vehicle. Furthermore, a power storage device that can have various shapes can be provided in a small space in a vehicle, which allows a space in a trunk and a space for riders to be secured. The automobile 8100 includes the power storage device. The power storage device is used not only to drive the electric motor 8106, but also to supply electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 14B illustrates an automobile 8200 including the power storage device. The automobile 8200 can be charged when the power storage device is supplied with electric power through external charging equipment by a plug-in system, a contactless power feeding system, or the like. In FIG. 14B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the degree of flexibility in place where the power storage device can be provided is increased and thus a vehicle can be designed efficiently. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be freely combined with any one of Embodiments 1 to 3.

Embodiment 5

As other examples of electronic devices using power storage devices, medical electronic devices that can acquire biological data will be described. An electronic device 60 in FIGS. 15A and 15B can be formed in such a manner that a housing 61 is provided with one or more of sensors, and thus has a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With sensors 63a and 63b, for example, data on an environment (e.g., temperature) where the power storage device is placed can be determined and stored in a memory circuit 64. The housing 61 is provided with a display portion 62 that includes a touch input sensor.

For example, the electronic device 60 is provided with a light source such as an LED so that light from the light source can be emitted to a skin overlapping with the electronic device 60 to measure a change in bloodstream from reflected light from the inside of the skin and acquire pulse data by arithmetic processing. Measurement is performed at more than one portion and the average of the measurement results is used to acquire accurate biological data. The electronic device 60 is further provided with a circuit 65 that can perform signal processing operation such as a CPU.

The electronic device 60 may be provided with a sensor that can acquire biological data other than pulse data. Examples of other biological data include temperature, blood pressure, the amount of activity, the number of steps taken, and the proportion of subcutaneous fat.

Figure 15A:
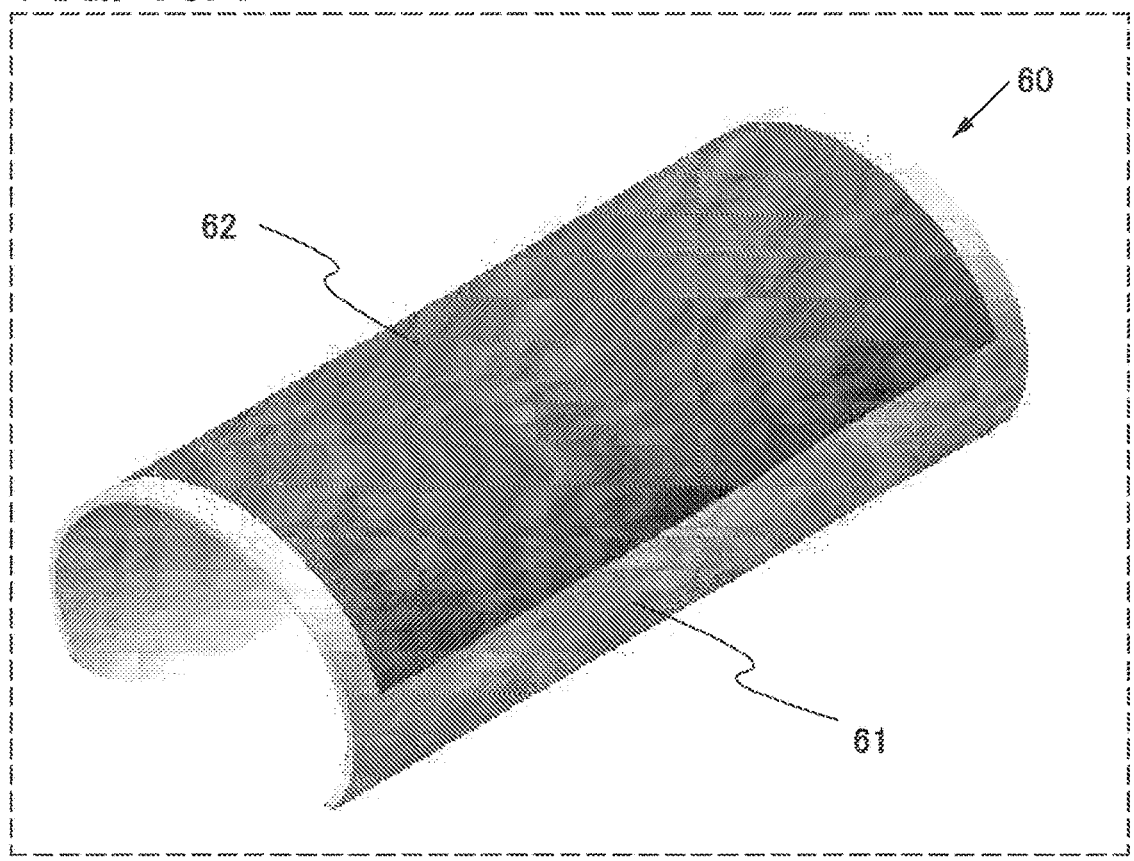
FIGS. 15A and 15B are external perspective views illustrating an electronic device of one embodiment of the present invention.
Figure 15B:
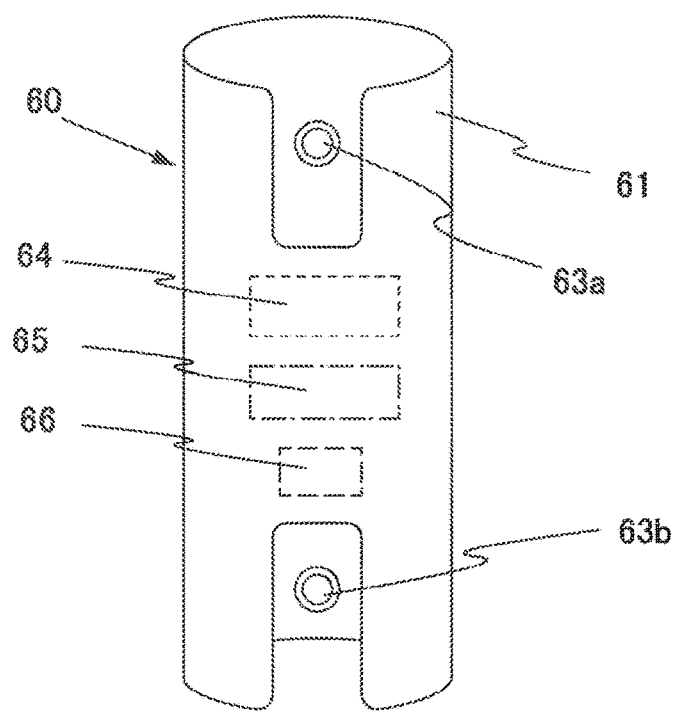

Although FIGS. 15A and 15B illustrate the electronic device including the display portion 62, one embodiment of the present invention is not particularly limited thereto. Even without the display portion 62, acquired biological data can be checked by being displayed on another electronic device such as a mobile phone or a smartphone when at least a circuit 66 (including an antenna, for example) that can send and receive biological data is provided. In the case where a user who wears the electronic device 60 on his or her arm is a person who requires nursing care, it is preferable that data be sent also to medical facilities such as a hospital in a remote location. In that case, data can be provided to the hospital in real time and the user can obtain directions regarding a proper treatment from a doctor in the hospital, for example, with a mobile phone or a smartphone.

The electronic device 60 may have a function of acquiring current biological data of a user as well as positional data received by GPS of the electronic device 60 and automatically informing a medical facility of the data urgently when he or she who wears the electronic device 60 on his or her arm collapses on a road because of physical abnormality. When data of a donor card or data on a user's name, age, blood type, and the like are stored in the circuit 64, a saver can obtain information on the user by using the electronic device 60 even if he or she is unconscious.

This embodiment can be freely combined with any one of Embodiments 1 to 4.

Note that what is described (or part thereof) in one embodiment can be applied to, combined with, or replaced with different contents in the embodiment and/or what is described (or part thereof) in another embodiment or other embodiments.

Note that in each embodiment, what is described in the embodiment is contents described with reference to a variety of diagrams or contents described with text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed and part of the range is removed, whereby one embodiment of the invention can be constituted excluding part of the range can be constructed. In this manner, it is possible to specify the technical scope of one embodiment of the present invention so that a conventional technology is excluded, for example.

As a specific example, a diagram of a circuit including first to fifth transistors is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a layered film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the embodiment of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or diode), a passive element (e.g., a capacitor or a resistor), are the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

EXAMPLE 1

In this example, the thin storage battery (lithium-ion secondary battery) described in Embodiment 1 was fabricated as a power storage device of one embodiment of the present invention. The initial charge and discharge characteristics of the lithium-ion secondary battery and the charge and discharge characteristics of the lithium-ion secondary battery subjected to a bending test using a bend tester were evaluated.

The lithium-ion secondary battery was fabricated according to Embodiment 1 using $LiCoO_2$ as a positive electrode active material, graphite as a negative electrode active material, and an embossed aluminum laminate film. The lithium-ion secondary battery obtained according to Embodiment 1 includes six current collectors each having one surface provided with a positive electrode active material layer and six current collectors each having one surface provided with a negative electrode active material layer. The thickness of the lithium-ion secondary battery is approximately 2.1 mm. Table 1 shows the size and the like of the battery.

TABLE 1

| | | |
|---|---|---|
| Voltage | | 3.7 V |
| Capacity | | about 300 mAh |
| External dimension (except lead portion) | Thickness | 2.1 mm |
| | Height | 75 mm |
| | Width | 60 mm |
| Weight | | about 11.5 g |

Figure 21A:
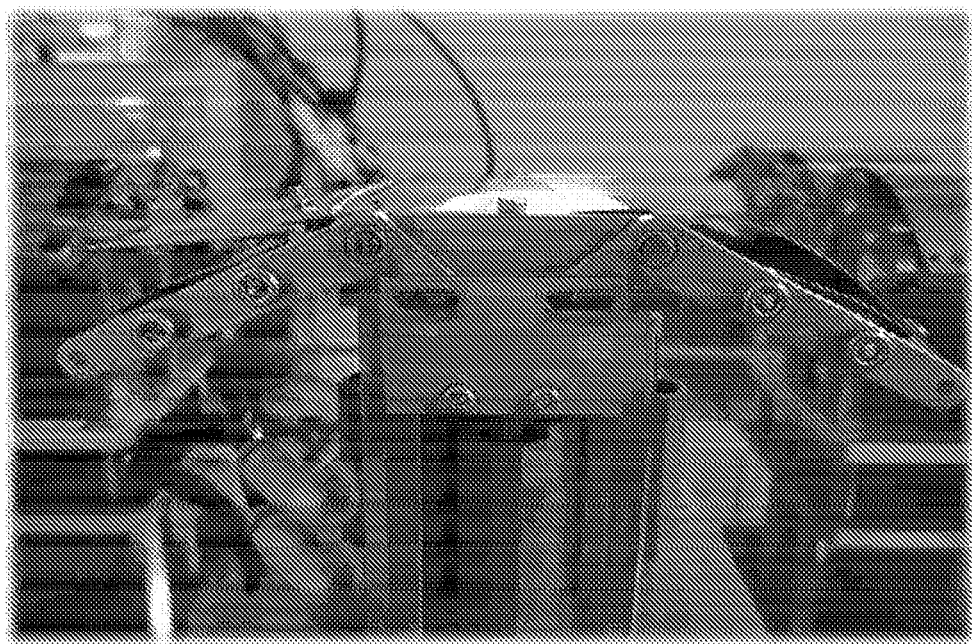
FIGS. 21A and 21B are photographs of a bend tester.
Figure 21B:
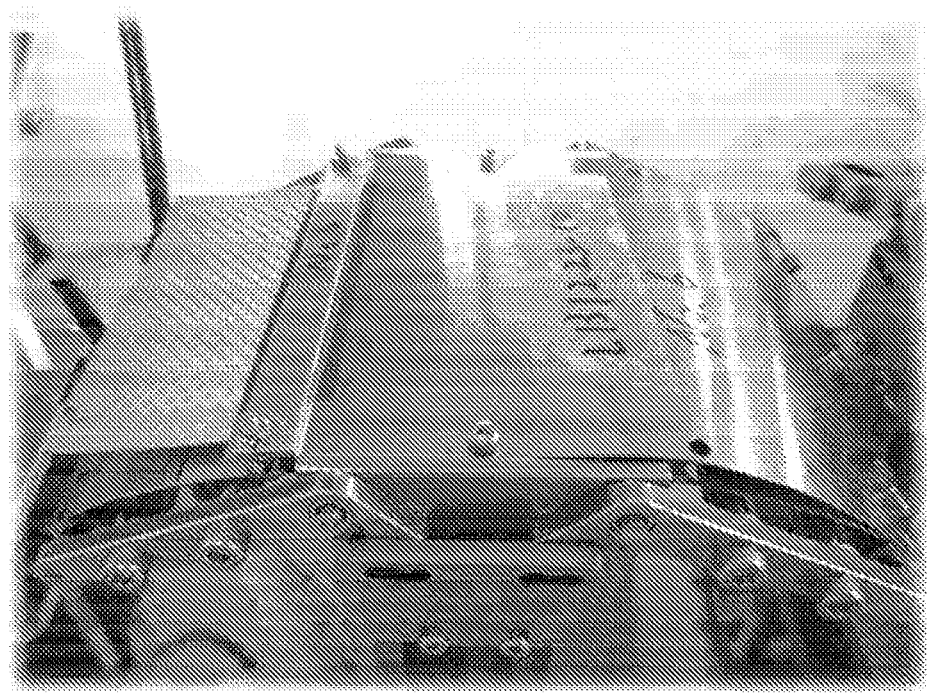

FIG. 21A is a photograph of the appearance of the bend tester. FIG. 21B shows the state where the fabricated lithium-ion secondary battery is placed on the tester. The tester includes a cylindrical supporting body with a radius of curvature of 40 min extending in the depth direction under the lithium-ion secondary battery in a center portion. The tester also includes an arm extending in the right direction and an arm extending in the left direction. End portions of the arms are mechanically connected to holding plates. By moving the end portions of the arms up or down, the holding plates can be bent along the supporting body. The bending test of the lithium-ion secondary battery was performed with the lithium-ion secondary battery sandwiched between the two holding plates. Thus, moving the end portions of the arms up or down allows the lithium-ion secondary battery to be bent along the cylindrical supporting body. Specifically, lowering the end portions of the arms permits the lithium-ion secondary battery to be bent with a radius of curvature of 40 mm. Since the lithium-ion secondary battery was bent while being sandwiched between the two holding plates, unnecessary force except bending force was able to be prevented from being applied to the lithium-ion secondary battery. Furthermore, bending force was able to be uniformly applied to the whole lithium-ion secondary battery.

The bending test was performed at intervals of 10 seconds in the range of radius of curvature from 40 mm to 150 mm. The charge and discharge characteristics were evaluated at 25° C. after the secondary battery was dismounted from the tester. Charging was performed at a constant current of 0.2

C (69 mA) until the voltage reached an upper voltage limit of 4.1 V and then performed at a rate of 0.01 C (3 mA) until the secondary battery was fully charged. Discharging was performed at a rate of 0.2 C (69 mA) until the voltage reached a lower voltage limit of 2.5 V.

Here, a charge rate and a discharge rate will be described. For example, in the case of charging a secondary battery with a capacity of X [Ah] at a constant current, a charge rate of 1 C means the current value I [A] with which charging is terminated in exactly 1 hour, and a charge rate of 0.2 C means I/5 [A] (i.e., the current value with which charging is terminated in exactly 5 hours). Similarly, a discharge rate of 1 C means the current value I [A] with which discharging is ended in exactly 1 hour, and a discharge rate of 0.2 C means I/5 [A] (i.e., the current value with which discharging is ended in exactly 5 hours).

Table 2 shows the results of the bending test. Note that discharge capacities (mAh/g) shown in Table 2 are each a value per unit weight of the positive electrode active material.

TABLE 2

| Number of times of bending (times) | Discharge capacity (mAh) | Discharge capacity (mAh/g) | Capacity maintenance rate (%) |
|---|---|---|---|
| 0 | 336.5 | 133.3 | 100 |
| 1000 | 335.6 | 132.9 | 99.7 |
| 3000 | 333.5 | 132.1 | 99.1 |
| 6000 | 331.1 | 131.1 | 98.35 |
| 10000 | 329.3 | 130.4 | 97.82 |

X-ray CT photographs were taken after bending was performed 0 times, 1000 times, 3000 times, 6000 times, and 10000 times and whether the inside was damaged was determined. FIGS. 22A to 22E show the respective X-ray CT photographs.

Figure 22A:
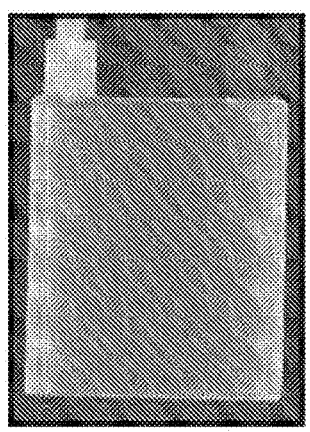
FIGS. 22A to 22E are X-ray CT photographs.
Figure 22B:
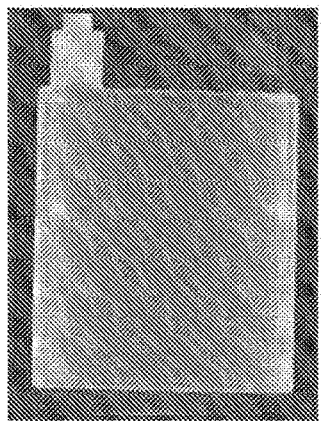
Figure 22C:
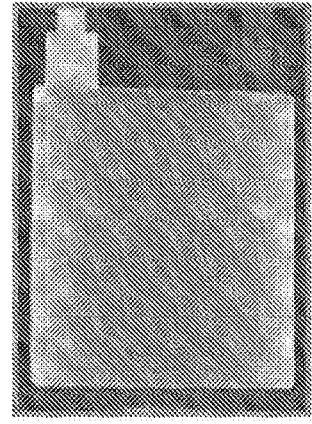
Figure 22D:
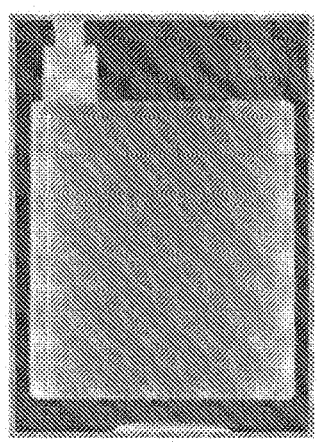
Figure 22E:
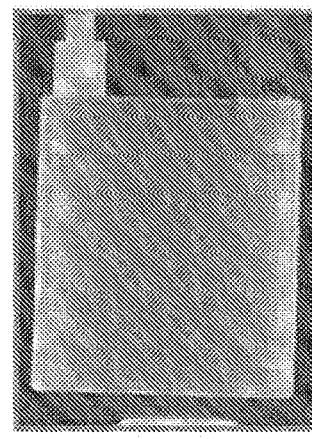
Figure 22F:
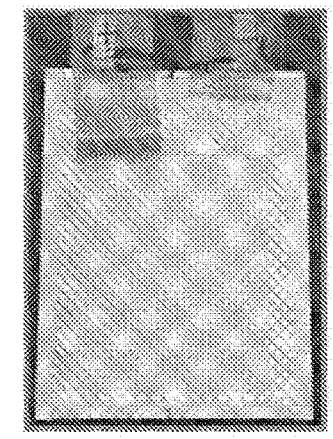
FIG. 22F is an external photograph.
Figure 22G:
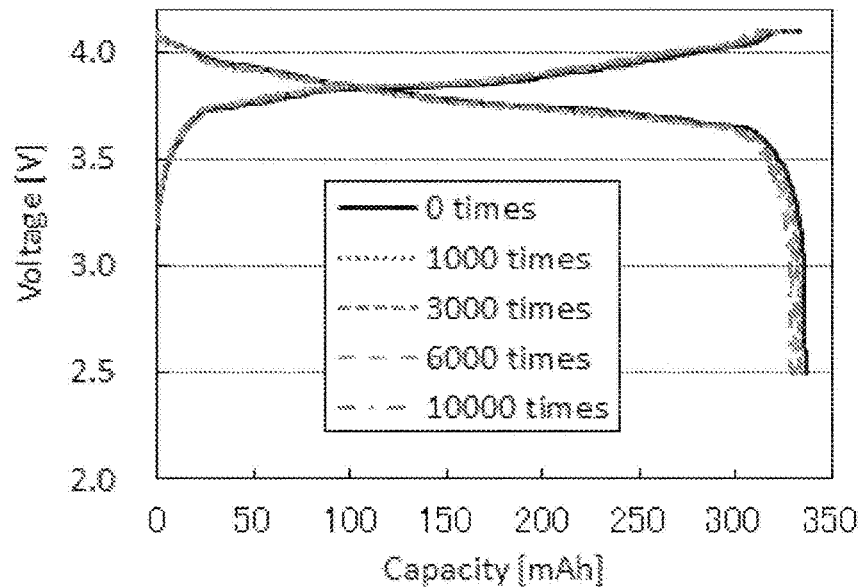
FIG. 22G is a graph showing charge and discharge characteristics.

FIG. 22F is a photograph of the appearance of the lithium-ion secondary battery after the bending test was performed 10000 times. FIG. 22G shows the charge and discharge characteristics.

It was confirmed that the lithium-ion secondary battery using the embossed film as the exterior body did not have any damage to its appearance or its internal structure even after being subjected to the bending test 10000 times and the charge and discharge curves reveal no abnormality.

EXAMPLE 2

In this example, a thin storage battery (lithium-ion secondary battery) including a positive electrode active material different form that in Example 1 was fabricated. The initial charge and discharge characteristics of the lithium-ion secondary battery and the charge and discharge characteristics of the lithium-ion secondary battery subjected to a bending test using a bend tester were evaluated.

The lithium-ion secondary battery was fabricated according to Embodiment 1 using $LiFePO_4$ as a positive electrode active material, graphite as a negative electrode active material, and an embossed aluminum laminate film. The lithium-ion secondary battery obtained according to Embodiment 1 includes 10 current collectors each having one surface provided with a positive electrode active material layer and 10 current collectors each having one surface provided with a negative electrode active material layer. The thickness of the lithium-ion secondary battery is approximately 3 mm. Table 3 shows the size and the like of the battery.

TABLE 3

| Voltage | | 3.2 V |
| Capacity | | about 300 mAh |
| External dimension (except lead portion) | Thickness | 3 mm |
| | Height | 75 mm |
| | Width | 60 mm |
| Weight | | About 16 g |

The charge and discharge characteristics were evaluated at 25° C. after the secondary battery was dismounted from the tester. Charging was performed at a constant current of 0.2 C (78 mA) until the voltage reached an upper voltage limit of 4.0 V. Discharging was performed at a rate of 0.2 C (78 mA) until the voltage reached a lower voltage limit of 2.0 V.

Table 4 shows the results of the bending test. Note that discharge capacities (mAh/g) shown in Table 4 are each a value per unit weight of the positive electrode active material.

TABLE 4

| Number of times of bending (times) | Discharge capacity (mAh) | Discharge capacity (mAh/g) | Capacity maintenance rate (%) |
|---|---|---|---|
| 0 | 315.9 | 138.7 | 100 |
| 1000 | 314.4 | 138 | 99.5 |
| 3000 | 312.9 | 137.4 | 99.06 |
| 6000 | 311 | 136.5 | 98.41 |
| 10000 | 309 | 135.7 | 97.84 |

X-ray CT photographs were taken after bending was performed 0 times, 1000 times, 3000 times, 6000 times, and 10000 times and whether the inside was damaged was determined. FIG. 23A to 23E show the respective X-ray CT photographs.

Figure 23A:
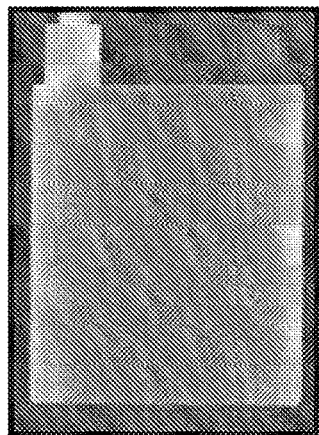
FIGS. 23A to 23E are X-ray CT photographs.
Figure 23B:
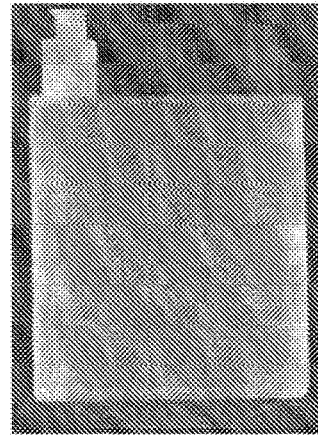
Figure 23C:
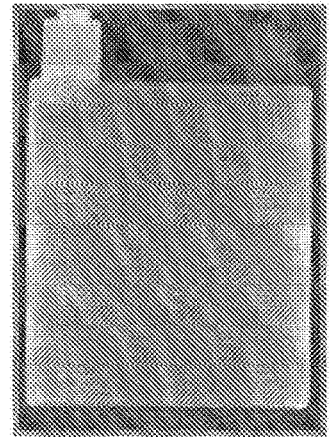
Figure 23D:
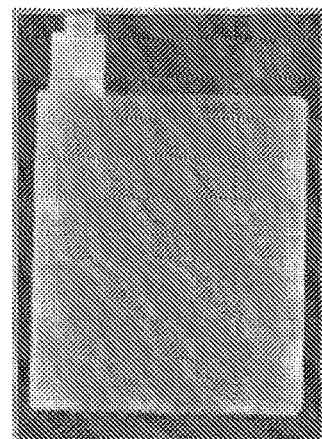
Figure 23E:
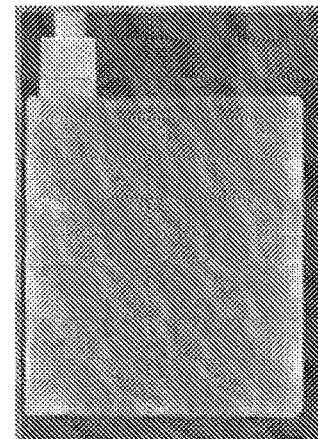
Figure 23F:
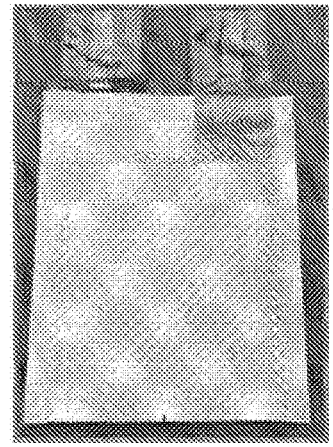
FIG. 23F is an external photograph.
Figure 23G:
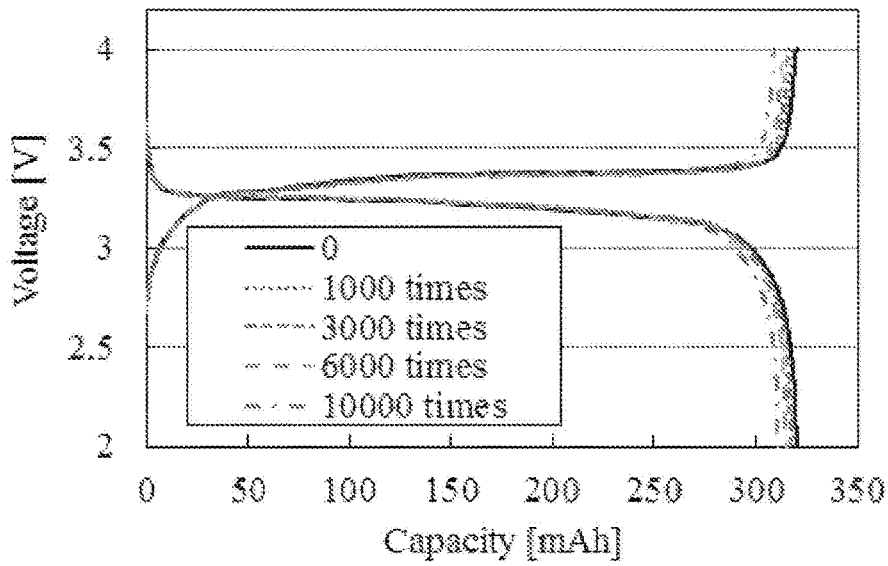
FIG. 23G is a graph showing charge and discharge characteristics.

FIG. 23F is a photograph of the appearance of the lithium-ion secondary battery after the bending test was performed 10000 times. FIG. 23G shows the charge and discharge characteristics.

It was confirmed that the lithium-ion secondary battery using the embossed film as the exterior body did not have any damage to its appearance or its internal structure even after being subjected to the bending test 10000 times and the charge and discharge curves reveal no abnormality, as in Example 1.

EXAMPLE 3

Figure 24A:
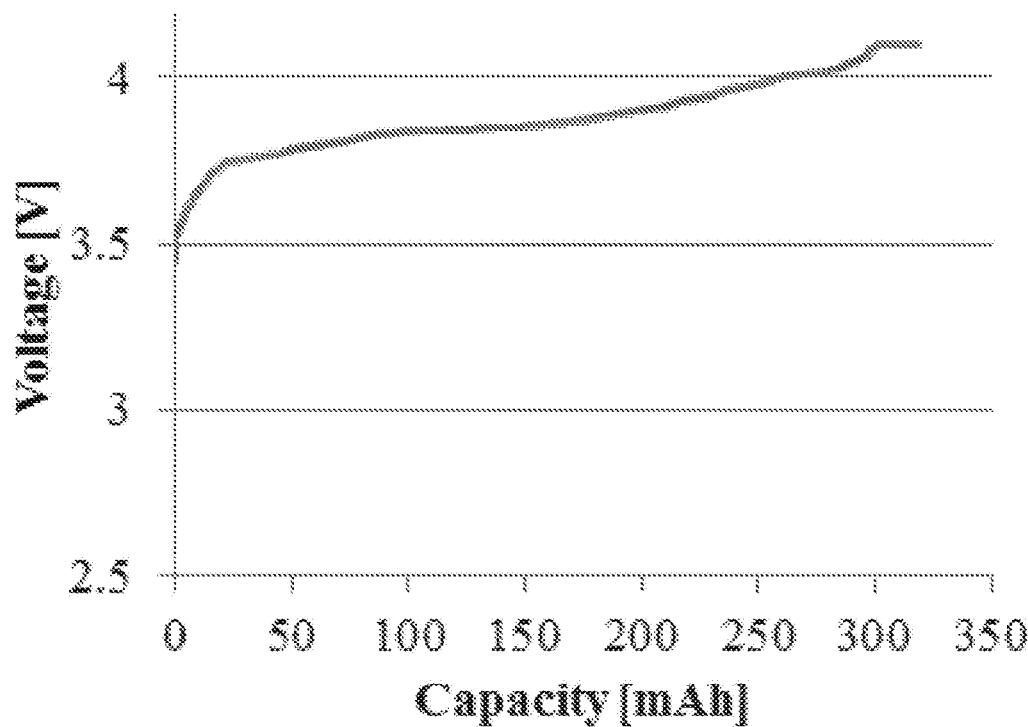
FIGS. 24A and 24B are graphs showing charge characteristics and discharge characteristics.

A lithium-ion secondary battery that includes $LiCoO_2$ as a positive electrode active material and has the same structure as the lithium-ion secondary battery in Example 1 was subjected to a bending test 1000 times while being charged at 0.2 C from the start of charging to the termination of charging. FIG. 24A shows the charge characteristics of the lithium-ion secondary battery.

Figure 24B:
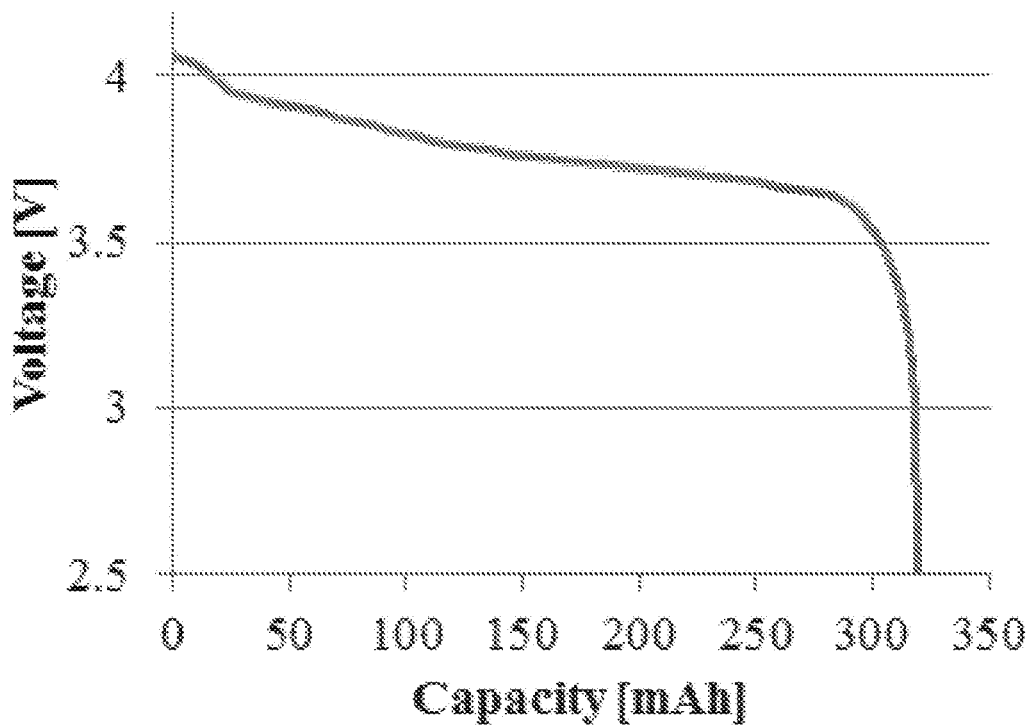

In addition, the lithium-ion secondary battery was subjected to the bending test 1000 times while being discharged (at 0.2 C) from the start of charging to the end of discharging (the end voltage: approximately 2.5 V). FIG. 24B shows the discharge characteristics of the lithium-ion secondary battery.

The results shown in FIGS. 24A and 24B reveal that there was no adverse effect such as a voltage change even when the bending test was performed during charging and discharging.

This application is based on Japanese Patent Application serial no. 2013-219546 filed with the Japan Patent Office on Oct. 22, 2013, Japanese Patent Application serial no. 2014-095169 filed with the Japan Patent Office on May 2, 2014, Japanese Patent Application serial no. 2014-107474 filed with the Japan Patent Office on May 23, 2014, and Japanese Patent Application serial no. 2014-133062 filed with the Japan Patent Office on Jun. 27, 2014, the entire contents of which are hereby incorporated by reference.

What is claimed is:

1. An electronic device comprising:
    a housing comprising a curved surface;
    a secondary battery comprising a curved surface, the secondary battery being along the curved surface of the housing; and
    an exterior body of the secondary battery, which is a film comprising a pattern including first depressions extending along a first direction and second depressions extending along a second direction intersecting the first direction in both a first region and a second region,
    wherein the first region is a center portion of the film,
    wherein the second region is an end portion of the film,
    wherein the first direction and the second direction are not parallel to an edge in a width direction of the film,
    wherein a depth of the first depressions in the first region is larger than a depth of the first depressions in the second region,
    wherein a depth of the second depressions in the first region is larger than a depth of the second depressions in the second region, and
    wherein the secondary battery is capable of changing its shape, repeatedly.

2. The electronic device according to claim 1, wherein the second region is in contact with an adhesive layer.

3. The electronic device according to claim 1, wherein the secondary battery comprises:
    a positive electrode current collector;
    a positive electrode active material layer;
    a negative electrode current collector; and
    a negative electrode active material layer.

4. The electronic device according to claim 3, wherein the positive electrode current collector, the positive electrode active material layer, the negative electrode current collector, and the negative electrode active material layer overlap with the first region.

5. The electronic device according to claim 1, wherein the film is a metal film.

6. The electronic device according to claim 1, further comprising a display portion comprising a curved surface,
    wherein the secondary battery overlaps with the display portion.

7. The electronic device according to claim 3,
    wherein each of the positive electrode current collector and the negative electrode current collector comprises a tab portion,
    wherein the tab portion is in contact with a lead electrode, and
    wherein the tab portion has a curved shape.

8. The electronic device according to claim 1, wherein the secondary battery is capable of changing its shape in accordance with changing of the housing.

9. The electronic device according to claim 1, further comprising a current control circuit,
    wherein the secondary battery is electrically connected to the current control circuit.

10. The electronic device according to claim 1, further comprising a flexible display module,
    wherein the flexible display module is electrically connected to the secondary battery.

11. An electronic device comprising:
    a housing;
    a secondary battery in contact with a portion of the housing; and
    an exterior body of the secondary battery, which is a film comprising a pattern including first depressions extending along a first direction and second depressions extending along a second direction intersecting the first direction in both a first region and a second region,
    wherein the first region is a center portion of the film,
    wherein the second region is an end portion of the film,
    wherein the first direction and the second direction are not parallel to an edge in a width direction of the film,
    wherein a depth of the first depressions in the first region is larger than a depth of the first depressions in the second region,
    wherein a depth of the second depressions in the first region is larger than a depth of the second depressions in the second region, and
    wherein the portion of the housing is capable of changing its shape, repeatedly.

12. The electronic device according to claim 2, wherein the second region is in contact with an adhesive layer.

13. The electronic device according to claim 2, wherein the secondary battery comprises:
    a positive electrode current collector;
    a positive electrode active material layer;
    a negative electrode current collector; and
    a negative electrode active material layer.

14. The electronic device according to claim 13, wherein the positive electrode current collector, the positive electrode active material layer, the negative electrode current collector, and the negative electrode active material layer overlap with the first region.

15. The electronic device according to claim 2, wherein the film is a metal film.

16. The electronic device according to claim 2, further comprising a display portion comprising a curved surface,
    wherein the secondary battery overlaps with the display portion.

17. The electronic device according to claim 13,
    wherein each of the positive electrode current collector and the negative electrode current collector comprises a tab portion,
    wherein the tab portion is in contact with a lead electrode, and
    wherein the tab portion has a curved shape.

18. The electronic device according to claim 2, wherein the secondary battery is capable of changing its shape in accordance with changing of the housing.

19. The electronic device according to claim 2, further comprising a current control circuit,
    wherein the secondary battery is electrically connected to the current control circuit.

20. The electronic device according to claim 2, further comprising a flexible display module, wherein the flexible display module is electrically connected to the secondary battery.

* * * * *